United States Patent
Park et al.

(10) Patent No.: US 12,539,037 B2
(45) Date of Patent: Feb. 3, 2026

(54) METHOD FOR ESTIMATING EYE PROTRUSION VALUE, AND SYSTEM FOR PERFORMING SAME

(71) Applicant: THYROSCOPE INC., Ulsan (KR)

(72) Inventors: Joon Hyeon Park, Suwon-si (KR); Kyubo Shin, Ulsan (KR); Jongchan Kim, Ulsan (KR)

(73) Assignee: THYROSCOPE INC., Ulsan (KR)

( * ) Notice: Subject to any disclaimer, the term of this patent is extended or adjusted under 35 U.S.C. 154(b) by 0 days.

(21) Appl. No.: 19/090,877

(22) Filed: Mar. 26, 2025

(65) Prior Publication Data
US 2025/0228451 A1 Jul. 17, 2025

Related U.S. Application Data

(63) Continuation of application No. PCT/KR2025/000680, filed on Jan. 10, 2025.

(30) Foreign Application Priority Data

Jan. 12, 2024 (KR) .......................... 10-2024-0005310
Feb. 8, 2024 (KR) .......................... 10-2024-0019438

(51) Int. Cl.
*A61B 3/107* (2006.01)
*A61B 3/00* (2006.01)
(Continued)

(52) U.S. Cl.
CPC ............ *A61B 3/107* (2013.01); *A61B 3/0025* (2013.01); *A61B 3/14* (2013.01); *G06T 7/0012* (2013.01);
(Continued)

(58) Field of Classification Search
CPC ..... A61B 3/0025; A61B 3/102; A61B 3/1005; A61B 3/14; A61B 3/028; A61B 3/10;
(Continued)

(56) References Cited

U.S. PATENT DOCUMENTS 11,443,445 B2  9/2022  Gan et al.
11,717,160 B2 *  8/2023  Shin ..................... A61B 5/4227
                                                600/476

FOREIGN PATENT DOCUMENTS

CN       115731163 A  *  3/2023
KR       20200044108 A     4/2020
(Continued)

OTHER PUBLICATIONS

Machine translation obtained from google patents of WO-2023109871-A1 (Year: 2023).*

(Continued)

*Primary Examiner* — Courtney Joan Nelson
(74) *Attorney, Agent, or Firm* — Dinsmore & Shohl LLP

(57) ABSTRACT

According to an embodiment disclosed in the present application, proposed is a method for estimating an eye protrusion value, the method including: obtaining an image representing at least one eye of the subject, wherein the image includes a plurality of pixels assigned a value corresponding to at least one of brightness and color; obtaining a pre-processed image by performing a previously stored pre-processing for the image; obtaining a depth image corresponding to the pre-processed image by applying the pre-processed image to a pre-trained depth image generation model, wherein the depth image includes a plurality of pixels, wherein each of the plurality of pixels of the depth image is assigned a depth value representing a relative distance of an object corresponding to each of a plurality of pixels of the pre-processed image; and estimating an eye protrusion value for the eye of the subject by applying both the pre-processed image and the depth image to a pre-trained eye protrusion value estimation model.

19 Claims, 18 Drawing Sheets

(51) Int. Cl.
  *A61B 3/14* (2006.01)
  *G06T 7/00* (2017.01)
  *G06T 7/55* (2017.01)
  *G16H 50/30* (2018.01)

(52) U.S. Cl.
  CPC ............... *G06T 7/55* (2017.01); *G16H 50/30* (2018.01); *G06T 2207/10024* (2013.01); *G06T 2207/10028* (2013.01); *G06T 2207/20081* (2013.01); *G06T 2207/20084* (2013.01); *G06T 2207/20132* (2013.01); *G06T 2207/30041* (2013.01); *G06T 2207/30201* (2013.01)

(58) Field of Classification Search
  CPC ....... A61B 8/10; A61B 3/0058; A61B 5/6821; A61B 3/107; G06T 2207/30041; G06T 2207/10024; G06T 2207/10101; G06T 7/0012; G06T 2210/41; G06T 13/40; G06T 2207/20081; G06T 2207/20084; G06T 5/50; G06T 7/55; G06T 2207/10028; G06T 2207/20132; G06T 2207/30201; G16H 30/40; G16H 50/20; G16H 30/20; G16H 50/30; G06N 3/0464
  See application file for complete search history.

(56) References Cited

FOREIGN PATENT DOCUMENTS

| KR | 20200134022 A | 12/2020 | | |
|---|---|---|---|---|
| KR | 20220052166 A | 4/2022 | | |
| KR | 20240002133 A | 1/2024 | | |
| WO | WO-2010117386 A1 | * | 10/2010 | ............ A61B 3/032 |
| WO | WO-2020235939 A2 | * | 11/2020 | ........... A61B 5/0024 |
| WO | WO-2023109871 A1 | * | 6/2023 | |
| WO | WO-2024035131 A1 | * | 2/2024 | ........... A61B 3/0025 |

OTHER PUBLICATIONS

Machine translation obtained from google patents of WO-2020235939-A2 (Year: 2020).*
Machine translation obtained from google patents of WO-2024035131-A1 (Year: 2024).*
Machine translation obtained from google patents of CN-115731163-A (Year: 2023).*
PCT International Search Report and Written Opinion of International Patent Application PCT/KR2025/000680, mailed Apr. 13, 2025, 18 pages, Korean Intellectual Property Office (KIPO).
Office Action of Korean Patent Application No. 10-2025-7005522, mailed May 13, 2025, 19 pages, Korean Intellectual Property Office (KIPO).
Khan, Faisal, et al., "Towards Monocular Neural Facial Depth Estimation: Past, Present, and Future," IEEE Access, Mar. 11, 2022, pp. 29589-29611, vol. 10, IEEE, DOI: 10.1109/ACCESS.2022.3158950.
Extended European search report of EP Application No. 25711589.9 issued on Dec. 9, 2025.
"An Intelligent Diagnostic System for Thyro+B3B45id— Association Ophthalmopathy Based on Facial Images" vol. 9 (Jun. 10, 2022).
"Glandy EXO: A Deep Learning Approach for Proptosis Measurement in Thyroiod Eye Disease"(Oct. 1, 2024).

* cited by examiner

METHOD FOR ESTIMATING EYE PROTRUSION VALUE, AND SYSTEM FOR PERFORMING SAME

CROSS-REFERENCE TO RELATED APPLICATIONS

This application is a continuation of International Application No. PCT/KR2025/000680 filed on Jan. 10, 2025, which claims priority to Korean Patent Application No. 10-2024-0005310 filed on Jan. 12, 2024 and Korean Patent Application No. 10-2024-0019438 filed on Feb. 8, 2024, the entire contents of which are herein incorporated by reference.

TECHNICAL FIELD

The present disclosure relates to a method for estimating an eye protrusion value of a subject by using an image that represents the subject's eye captured through a camera, and a system for performing the method.

BACKGROUND ART

Exophthalmos is a symptom in which the eyeball protrudes further forward than normal, and can be caused by a variety of factors, such as thyroid dysfunction or tumors. Eye protrusion values, which indicate the degrees of protrusion of eyeballs, vary from person to person, and the needs for and directions of treatments depend on the eye protrusion values, so accurate measurement is important. In addition, after the treatment of exophthalmos, it is necessary to continuously check and manage the eye protrusion value to prevent the recurrence of the symptom. Therefore, it is necessary to know the patient's eye protrusion value for appropriate treatment and management, but there is a problem that the patient can only know his or her eye protrusion value by visiting the hospital and having the value measured by a medical worker.

To solve this problem, there have been attempts to estimate the eye protrusion value by using an image of the user's eye captured by himself or herself. For example, after the user takes an image of the side of his or her eye using his or her mobile device, the side image is used to estimate the eye protrusion value. Although the side image is good for estimating the eye protrusion value, it is necessary to take the side image that satisfies determined conditions in order to estimate the eye protrusion value from the side image. However, in order to capture the side image satisfying the conditions, the user must be facing forward and the side of the eye must be taken from the direction perpendicular to the user. Thus, it is quite difficult to capture the side image satisfying the determined conditions, which causes inconvenience to the user.

Therefore, there have been attempts to estimate the eye protrusion value by using a front image rather than a side image taken by the user through the mobile device. The front image has the advantage that it is easy to capture the front image by the user himself or herself using the mobile device. However, unlike the side image, the front image does not allow recognizing the degree to which the eyeball protrudes with the naked eye in a 2D image, so a special method is required to estimate the eye protrusion value using the front image.

Based on the assumption that outline information obtainable from the front image may be used to estimate the eye protrusion value, a 3D facial landmark detection model for recognizing 3D coordinate values of a landmark of a face is used to compute the z-axis difference from the center of the eye to the tail of the eye and compute the eye protrusion value. However, an accurate eye protrusion value is not computed only using the 3D facial landmark detection model.

In the meantime, based on the assumption that depth information obtainable from the front image may be used to estimate the eye protrusion value, a depth estimation model for estimating a depth value of a face is used to generate a depth map of the eye image and compute the eye protrusion value. However, an accurate eye protrusion value is not computed only using the depth map.

Accordingly, there is a need for a method for estimating an eye protrusion value by using a facial image that represents a user's eyes captured by the user's mobile device.

SUMMARY

Technical Problem

The disclosure in the present application is directed to providing a method for estimating an eye protrusion value by using a front facial image that is obtained using a personal electronic device that ordinary people can use, rather than a professional medical diagnostic device. Specifically, the disclosure is directed to providing a method for generating a depth image by using the obtained front facial image, and for estimating the eye protrusion value by using an estimation model that uses both the facial image and the depth image.

In addition, the disclosure in the present application is directed to providing medical information to the user on the basis of the above-described estimated eye protrusion value.

Technical problems to be solved by the present application are not limited to the aforementioned technical problems and other technical problems which are not mentioned will be clearly understood by those skilled in the art from the present specification and the accompanying drawings.

Technical Solution

According to an embodiment disclosed in the present application, there is provided a method for predicting eye protrusion, the method including: obtaining a first visible light image captured by a visible light camera, wherein the first visible light image represents a subject's at least one eye, the first visible light image includes a plurality of pixels, and each of the plurality of pixels of the first visible light image is assigned a value corresponding to at least one of brightness and color; using a pre-trained first artificial neural network model to generate a first depth image corresponding to the first visible light image, wherein the first artificial neural network model is trained to output a generated image having at least one pixel to which an estimated depth value corresponding to at least one pixel included in an input image is applied, the first depth image includes a plurality of pixels, and each of the plurality of pixels of the first depth image is assigned a depth value estimated on the basis of the first visible light image; performing preprocessing on the first visible light image to generate a preprocessed first visible light image; performing preprocessing on the first depth image to generate a preprocessed first depth image; and applying both the preprocessed first visible light image and the preprocessed first depth image to a pre-trained eye protrusion value estimation model to estimate the eye protrusion value for the subject's eye, wherein the eye protrusion value estimation model is trained using a preprocessed second visible light image generated by preprocessing a second visible light image, a preprocessed second depth image generated by preprocessing a second depth image corresponding to the second visible light image, and an eye protrusion value corresponding to the second visible light image.

According to an embodiment disclosed in the present application, there is provided a method for estimating eye protrusion value of a subject, comprising: obtaining an image representing at least one eye of the subject, wherein the image comprises a plurality of pixels assigned a value corresponding to at least one of brightness and color; obtaining a pre-processed image by performing a previously stored pre-processing for the image; obtaining a depth image corresponding to the pre-processed image by applying the pre-processed image to a pre-trained depth image generation model, wherein the depth image comprises a plurality of pixels, wherein each of the plurality of pixels of the depth image is assigned a depth value representing a relative distance of an object corresponding to each of a plurality of pixels of the pre-processed image; and estimating an eye protrusion value for the eye of the subject by applying both the pre-processed image and the depth image to a pre-trained eye protrusion value estimation model.

According to an embodiment disclosed in the present application, the pre-trained eye protrusion value estimation model is trained using a training pre-processed image generated by preprocessing an image in which at least one eye of a first subject is represented, a training depth image corresponding to the training pre-processed image and an eye protrusion value of the first subject.

According to an embodiment disclosed in the present application, the image includes one eye of the subject, and wherein the eye protrusion value indicates an eye protrusion value of the one eye represented in the image.

According to an embodiment disclosed in the present application, the image includes both eyes of the subject, and wherein the eye protrusion value is a set consisting of an eye protrusion value of a left eye of the subject and an eye protrusion value of a right eye of the subject represented in the image.

According to an embodiment disclosed in the present application, the image includes both eyes of the subject, wherein the pre-processed image comprises a first image corresponding to a left eye of the subject and a second image corresponding to a right eye of the subject, wherein an eye protrusion value estimated using the first image is an eye protrusion value of the right eye of the subject represented in the image, and wherein an eye protrusion value estimated using the second image is an eye protrusion value of the left eye of the subject represented in the image.

According to an embodiment disclosed in the present application, the image represents an entire facial region of the subject including both eyes, and wherein the generating the pre-processed image comprises: obtaining the pre-processed image by cropping the image to at least a partial region where the both eyes of the subject are represented.

According to an embodiment disclosed in the present application, the image represents an entire facial region of the subject including at least one eye and a nasal bridge, and wherein the generating the pre-processed image comprises: obtaining the pre-processed image by cropping the image to at least a partial region where the at least one eye and the nasal bridge of the subject are represented.

According to an embodiment disclosed in the present application, the depth value is a value between a predetermined minimum value and a predetermined maximum value, wherein the depth value is the predetermined maximum value when an object represented in at least one pixel of the pre-processed image corresponding to a pixel of the depth image to which the depth value is assigned is the closest object represented in the pre-processed image, wherein when the object is the farthest object represented in the pre-processed image, the depth value is the predetermined minimum value, wherein when the object is the closer object in the pre-processed image, the depth value is a value closer to the predetermined maximum value, wherein when the object is the farther object in the pre-processed image, the depth value is a value closer to the predetermined minimum value.

According to an embodiment disclosed in the present application, the depth value is a value between a predetermined minimum value and a predetermined maximum value, wherein the depth value is the predetermined minimum value when an object represented in at least one pixel of the pre-processed image corresponding to a pixel of the depth image to which the depth value is assigned is the closest object represented in the pre-processed image, wherein when the object is the farthest object represented in the pre-processed image, the depth value is the predetermined maximum value, wherein when the object is the closer object in the pre-processed image, the depth value is a value closer to the predetermined minimum value, wherein when the object is the farther object in the pre-processed image, the depth value is a value closer to the predetermined maximum value.

According to an embodiment disclosed in the present application, the eye protrusion value estimation model comprises an artificial neural network structure, wherein the eye protrusion value estimation model is configured to: obtain a first intermediate result by processing values assigned to each pixel of the pre-processed image, obtain a second intermediate result by processing values assigned to each pixel of the depth image, obtain a third intermediate result by connecting the first intermediate result and the second intermediate result, output the eye protrusion value by processing the third intermediate result.

According to an embodiment disclosed in the present application, the eye protrusion value estimation model is configured to: obtain a first intermediate result by processing values assigned to each pixel of the pre-processed image through a first layer having a first ResNet structure, obtain a second intermediate result by processing values assigned to each pixel of the depth image through a second layer having the first ResNet structure, obtain a third intermediate result by connecting the first intermediate result and the second intermediate result, output the eye protrusion value by processing the third intermediate result through a third layer having a second ResNet structure.

According to an embodiment disclosed in the present application, the image represents an entire facial region of the subject including both eyes, and wherein the image satisfies at least one of following conditions: i) a degree of a smile of a face is within a predetermined level, ii) a horizontal rotation angle of the face is within a predetermined angle range, iii) a vertical rotation angle of the face is within a predetermined angle range, iv) the face is located within a predetermined distance.

According to an embodiment disclosed in the present application, the obtaining the image captured by the visible light camera, further comprises: providing a capturing guide for obtaining the image which satisfies the conditions.

According to an embodiment disclosed in the present application, the method further comprises: providing the estimated eye protrusion value to a user device.

According to an embodiment disclosed in the present application, the method further comprises: providing a visitation guidance message for the subject when the estimated eye protrusion value is equal to or greater than a predetermined threshold.

According to an embodiment disclosed in the present application, the predetermined threshold is determined based on at least one of a race and a facial shape of the subject.

According to an embodiment disclosed in the present application, the method further comprises: obtaining a past eye protrusion value; and providing a visitation guidance message for the subject when a difference between the estimated eye protrusion value and the past eye protrusion value is equal to or greater than a predetermined threshold.

According to an embodiment disclosed in the present application, the method further comprises: providing an information to determine at least one of a severity of thyroid eye disease and an activity of thyroid eye disease for the subject based on the estimated eye protrusion value.

According to an embodiment disclosed in the present application, the method further comprises: providing an information to determine whether at least one of medication treatment and surgery is needed for the subject based on the estimated eye protrusion value.

According to an embodiment disclosed in the present application, the method further comprises: providing an information to determine an extent of surgery required for the subject based on the estimated eye protrusion value.

According to an embodiment disclosed in the present application, the obtaining the image comprises: obtaining at least a first image and a second image for the subject, wherein the first image and the second image are obtained under the same capturing conditions.

According to an embodiment disclosed in the present application, the obtaining the pre-processed image, the obtaining the depth image and the estimating the eye protrusion value are performed once for the first image and once for the second image, wherein an average value of a first eye protrusion value for the first image and a second eye protrusion value for the second image is estimated as the eye protrusion value for a day on which the first image and the second image are obtained.

Advantageous Effects

According to an embodiment disclosed in the present application, a method for estimating an eye protrusion value by using a front facial image that is obtained using a personal electronic device that ordinary people can use, rather than a professional medical diagnostic device can be provided. Specifically, a method for generating a depth image by using the obtained front facial image, and for estimating the eye protrusion value by using an estimation model that uses both the facial image and the depth image can be provided.

According to an embodiment disclosed in the present application, medical information may be provided to the user on the basis of the above-described estimated eye protrusion value.

The effects of the present disclosure are not limited to the aforementioned effects and other effects which are not mentioned will be clearly understood by those skilled in the art from the present specification and the accompanying drawings.

DETAILED DESCRIPTION

Figure 1:
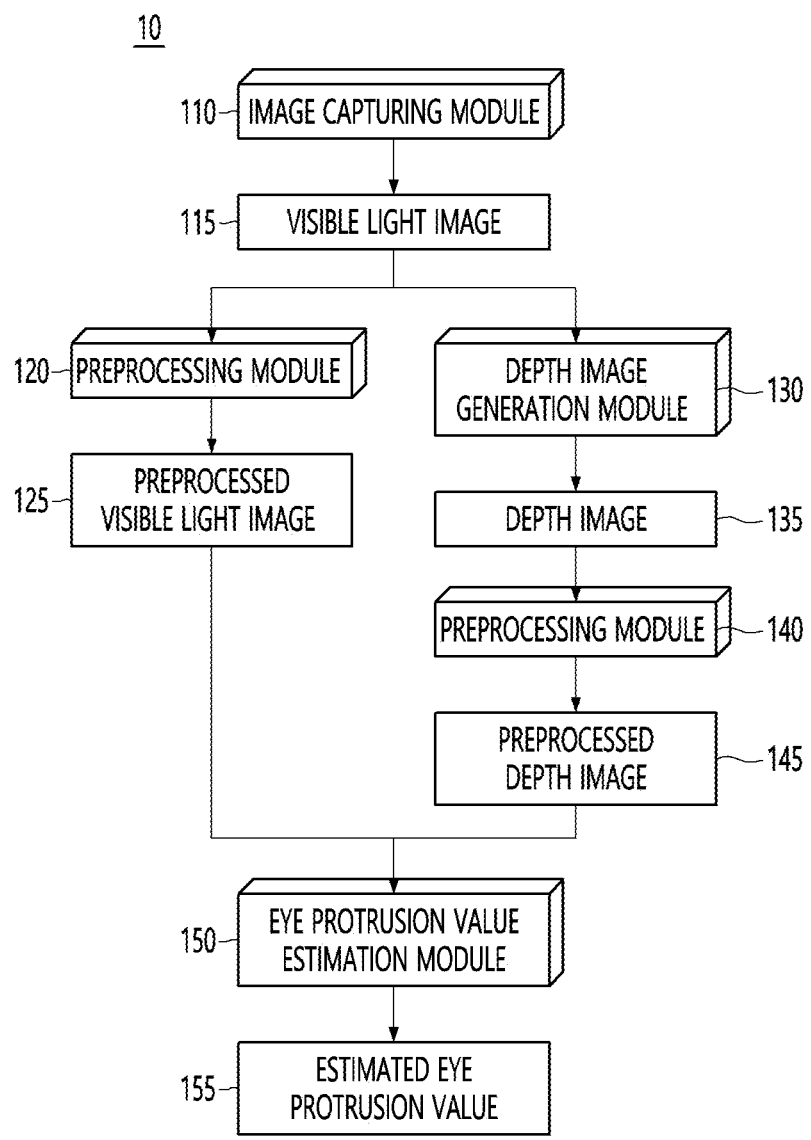
FIG. 1 is a diagram illustrating a process of estimating an eye protrusion value according to an embodiment.

Embodiments described in the present application are for clearly describing the idea of the present disclosure to those skilled in the art to which the present disclosure belongs, so the present disclosure is not limited to the embodiments described in the present application and the scope of the present disclosure should be construed as including modifications or variations that are within the idea of the present disclosure.

As the terms used in the present application, general terms currently widely used are used considering functions in the present disclosure. However, the terms may vary according to the intentions of those skilled in the art, customs, or the emergence of new technology. However, unlike this, when a particular term is used defined as having an optional meaning, the meaning of the term will be described. Thus, the terms used in the present specification should be construed based on the actual meanings of the terms and details throughout the present application rather than simply the names of the terms.

Numbers (for example, first, second, etc.) used in the description of the present application are merely identifiers for distinguishing one element from another.

In the following embodiments, an expression used in the singular encompasses the expression of the plural, unless it has a clearly different meaning in the context.

In the following embodiments, it is to be understood that terms such as "including" or "having" are intended to indicate the existence of features or elements disclosed in the present application, and are not intended to preclude the possibility that one or more other features or elements may be added.

The drawings accompanying the present application are for easily describing the present disclosure, and the shapes shown in the drawings may be exaggerated to help the understanding of the present disclosure, so the present disclosure is not limited by the drawings.

In a case in which a particular embodiment is realized otherwise, a particular process may be performed out of the order described. For example, two processes described in succession may be performed substantially simultaneously, or may be performed in an order opposite to the order described.

In the present application, if it is decided that a detailed description of known configuration or function related to the present disclosure makes the subject matter of the present disclosure unclear, the detailed description is omitted.

According to an embodiment disclosed in the present application, there is provided a method for predicting eye protrusion, the method including: obtaining a first visible light image captured by a visible light camera, wherein the first visible light image represents a subject's at least one eye, the first visible light image includes a plurality of pixels, and each of the plurality of pixels of the first visible light image is assigned a value corresponding to at least one of brightness and color; using a pre-trained first artificial neural network model to generate a first depth image corresponding to the first visible light image, wherein the first artificial neural network model is trained to output a generated image having at least one pixel to which an estimated depth value corresponding to at least one pixel included in an input image is applied, the first depth image includes a plurality of pixels, and each of the plurality of pixels of the first depth image is assigned a depth value estimated on the basis of the first visible light image; performing preprocessing on the first visible light image to generate a preprocessed first visible light image; performing preprocessing on the first depth image to generate a preprocessed first depth image; and applying both the preprocessed first visible light image and the preprocessed first depth image to a pre-trained eye protrusion value estimation model to estimate the eye protrusion value for the subject's eye, wherein the eye protrusion value estimation model is trained using a preprocessed second visible light image generated by preprocessing a second visible light image, a preprocessed second depth image generated by preprocessing a second depth image corresponding to the second visible light image, and an eye protrusion value corresponding to the second visible light image.

According to an embodiment disclosed in the present application, there is provided a method for estimating eye protrusion value of a subject, comprising: obtaining an image representing at least one eye of the subject, wherein the image comprises a plurality of pixels assigned a value corresponding to at least one of brightness and color; obtaining a pre-processed image by performing a previously stored pre-processing for the image; obtaining a depth image corresponding to the pre-processed image by applying the pre-processed image to a pre-trained depth image generation model, wherein the depth image comprises a plurality of pixels, wherein each of the plurality of pixels of the depth image is assigned a depth value representing a relative distance of an object corresponding to each of a plurality of pixels of the pre-processed image; and estimating an eye protrusion value for the eye of the subject by applying both the pre-processed image and the depth image to a pre-trained eye protrusion value estimation model.

According to an embodiment disclosed in the present application, the pre-trained eye protrusion value estimation model is trained using a training pre-processed image generated by preprocessing an image in which at least one eye of a first subject is represented, a training depth image corresponding to the training pre-processed image and an eye protrusion value of the first subject.

According to an embodiment disclosed in the present application, the image includes one eye of the subject, and wherein the eye protrusion value indicates an eye protrusion value of the one eye represented in the image.

According to an embodiment disclosed in the present application, the image includes both eyes of the subject, and wherein the eye protrusion value is a set consisting of an eye protrusion value of a left eye of the subject and an eye protrusion value of a right eye of the subject represented in the image.

According to an embodiment disclosed in the present application, the image includes both eyes of the subject, wherein the pre-processed image comprises a first image corresponding to a left eye of the subject and a second image corresponding to a right eye of the subject, wherein an eye protrusion value estimated using the first image is an eye protrusion value of the right eye of the subject represented in the image, and wherein an eye protrusion value estimated using the second image is an eye protrusion value of the left eye of the subject represented in the image.

According to an embodiment disclosed in the present application, the image represents an entire facial region of the subject including both eyes, and wherein the generating the pre-processed image comprises: obtaining the pre-processed image by cropping the image to at least a partial region where the both eyes of the subject are represented.

According to an embodiment disclosed in the present application, the image represents an entire facial region of the subject including at least one eye and a nasal bridge, and wherein the generating the pre-processed image comprises: obtaining the pre-processed image by cropping the image to at least a partial region where the at least one eye and the nasal bridge of the subject are represented.

According to an embodiment disclosed in the present application, the depth value is a value between a predetermined minimum value and a predetermined maximum value, wherein the depth value is the predetermined maximum value when an object represented in at least one pixel of the pre-processed image corresponding to a pixel of the depth image to which the depth value is assigned is the closest object represented in the pre-processed image, wherein when the object is the farthest object represented in the pre-processed image, the depth value is the predetermined minimum value, wherein when the object is the closer object in the pre-processed image, the depth value is a value closer to the predetermined maximum value, wherein when the object is the farther object in the pre-processed image, the depth value is a value closer to the predetermined minimum value.

According to an embodiment disclosed in the present application, the depth value is a value between a predetermined minimum value and a predetermined maximum value, wherein the depth value is the predetermined minimum value when an object represented in at least one pixel of the pre-processed image corresponding to a pixel of the depth image to which the depth value is assigned is the closest object represented in the pre-processed image, wherein when the object is the farthest object represented in the pre-processed image, the depth value is the predetermined maximum value, wherein when the object is the closer object in the pre-processed image, the depth value is a value closer to the predetermined minimum value, wherein when the object is the farther object in the pre-processed image, the depth value is a value closer to the predetermined maximum value.

According to an embodiment disclosed in the present application, the eye protrusion value estimation model comprises an artificial neural network structure, wherein the eye protrusion value estimation model is configured to: obtain a first intermediate result by processing values assigned to each pixel of the pre-processed image, obtain a second intermediate result by processing values assigned to each pixel of the depth image, obtain a third intermediate result by connecting the first intermediate result and the second intermediate result, output the eye protrusion value by processing the third intermediate result.

According to an embodiment disclosed in the present application, the eye protrusion value estimation model is configured to: obtain a first intermediate result by processing values assigned to each pixel of the pre-processed image through a first layer having a first ResNet structure, obtain a second intermediate result by processing values assigned to each pixel of the depth image through a second layer having the first ResNet structure, obtain a third intermediate result by connecting the first intermediate result and the second intermediate result, output the eye protrusion value by processing the third intermediate result through a third layer having a second ResNet structure.

According to an embodiment disclosed in the present application, the image represents an entire facial region of the subject including both eyes, and wherein the image satisfies at least one of following conditions: i) a degree of a smile of a face is within a predetermined level, ii) a horizontal rotation angle of the face is within a predetermined angle range, iii) a vertical rotation angle of the face is within a predetermined angle range, iv) the face is located within a predetermined distance.

According to an embodiment disclosed in the present application, the obtaining the image captured by the visible light camera, further comprises: providing a capturing guide for obtaining the image which satisfies the conditions.

According to an embodiment disclosed in the present application, the method further comprises: providing the estimated eye protrusion value to a user device.

According to an embodiment disclosed in the present application, the method further comprises: providing a visitation guidance message for the subject when the estimated eye protrusion value is equal to or greater than a predetermined threshold.

According to an embodiment disclosed in the present application, the predetermined threshold is determined based on at least one of a race and a facial shape of the subject.

According to an embodiment disclosed in the present application, the method further comprises: obtaining a past eye protrusion value; and providing a visitation guidance message for the subject when a difference between the estimated eye protrusion value and the past eye protrusion value is equal to or greater than a predetermined threshold.

According to an embodiment disclosed in the present application, the method further comprises: providing an information to determine at least one of a severity of thyroid eye disease and an activity of thyroid eye disease for the subject based on the estimated eye protrusion value.

According to an embodiment disclosed in the present application, the method further comprises: providing an information to determine whether at least one of medication treatment and surgery is needed for the subject based on the estimated eye protrusion value.

According to an embodiment disclosed in the present application, the method further comprises: providing an information to determine an extent of surgery required for the subject based on the estimated eye protrusion value.

According to an embodiment disclosed in the present application, the obtaining the image comprises: obtaining at least a first image and a second image for the subject, wherein the first image and the second image are obtained under the same capturing conditions.

According to an embodiment disclosed in the present application, the obtaining the pre-processed image, the obtaining the depth image and the estimating the eye protrusion value are performed once for the first image and once for the second image, wherein an average value of a first eye protrusion value for the first image and a second eye protrusion value for the second image is estimated as the eye protrusion value for a day on which the first image and the second image are obtained.

Hereinafter, a method for estimating an eye protrusion value, and a system therefor according to an embodiment will be described.

1. Eye Protrusion Value Estimation System

An eye protrusion value is an indicator of how much the eyeball protrudes, and may be determined by a vertical distance between the apex of the cornea and the lateral border of the orbit. That is, since the eye protrusion value is the vertical distance between the apex of the cornea and the lateral border of the orbit, making it difficult to estimate the eye protrusion value using only a front facial image.

However, according to embodiments disclosed in the present application, an eye protrusion value may be estimated using a front facial image. A specific method for estimating an eye protrusion value will be described below.

FIG. 1 is a diagram illustrating a process of estimating an eye protrusion value according to an embodiment.

Referring to FIG. 1, in order to estimate an eye protrusion value, an image capturing module 110, a preprocessing module 120, a depth image generation module 130, a preprocessing module 140, and an eye protrusion value estimation module 150 may be used. Specific details of each module will be described below.

(1) Image Capturing Module 110

Referring to FIG. 1, the image capturing module 110 may generate a visible light image 115.

The image capturing module 110 may include a camera module, and may include an optical lens, an image sensor, and an image processor.

The optical lens is a transmissive optical device that focuses or disperses rays of light by refraction, and may deliver rays of light to the image sensor. The image sensor is a device for converting an optical image into electrical signals, and may be provided as a chip in which multiple photodiodes are integrated. Examples of the image sensor may include a charge-coupled device (CCD), and a complementary metal-oxide-semiconductor (CMOS). The image processor may perform image processing on captured results, and may generate image information.

The image capturing module 110 may include a visible light camera module, and may generate the visible light image 115 through the visible light camera module. Herein, the visible light camera module means a camera module that detects visible light among rays of light.

The image capturing module 110 may generate the visible light image 115 in a monocular manner. For example, in order to generate the visible light image 115, one camera module may be used. No limitation thereto is imposed. When the image capturing module 110 includes a plurality of camera modules, the image capturing module 110 may synthesize a plurality of visible light images respectively obtained by the plurality of camera modules in a monocular manner to generate one visible light image 115.

The visible light image 115 may be an image including 2D pixels. Each pixel of the visible light image 115 may be assigned a value corresponding to color and/or brightness of visible light detected by the camera module.

For example, each pixel of the visible light image 115 may be assigned a value corresponding to red, a value corresponding to green, a value corresponding to blue, and/or a value corresponding to brightness.

As a more specific example, each pixel of the visible light image 115 may be assigned a value ranging from 0 to 255 corresponding to red, a value ranging from 0 to 255 corresponding to green, a value ranging from 0 to 255 corresponding to blue, and/or a value ranging from 0 to 255 corresponding to brightness, but is not limited thereto.

When a subject is captured through the image capturing module 110, the visible light image 115 may represent the captured subject.

For example, when the subject's face is captured through the image capturing module 110, the visible light image 115 may represent the subject's face. As another example, when the subject's eye is captured through the image capturing module 110, the visible light image 115 may represent the subject's eye.

(2) Preprocessing Module 120

Referring to FIG. 1, the preprocessing module 120 may preprocess the visible light image 115 to generate a preprocessed visible light image 125.

Preprocessing may include image cropping, image size adjustment, image inversion, image brightness adjustment, and/or image noise removal.

Image cropping means cropping a portion of an image to generate a cropped image.

For example, a portion of an image is extracted through image cropping to generate a new cropped image. As another example, excluding a portion of an image, the remaining portion may be removed through image cropping to generate a cropped image. Without being limited thereto, image cropping may include preprocessing which is commonly understood to be image cropping.

Image size adjustment means adjusting the number of pixels of an image. For example, adjustment of the horizontal size of an image may mean increasing or decreasing the number of pixels of the image in the horizontal direction, and adjustment of the vertical size of an image may mean increasing or decreasing the number of pixels of the image in the vertical direction. Without being limited thereto, image size adjustment may include preprocessing which is commonly understood to be image size adjustment.

Image inversion means swapping a value assigned to a particular pixel with a value assigned to a pixel in the opposite direction with a particular reference in the middle. For example, the particular reference may mean a line connecting particular pixel positions and/or particular pixels. As a specific example, the particular reference may mean the horizontal centerline and/or the vertical centerline of an image. As a more specific example, lateral inversion of an image may mean laterally flipping the image symmetrical with respect to the horizontal centerline of the image. Without being limited thereto, image inversion may include preprocessing which is commonly understood to be image inversion.

Image brightness adjustment means adjusting values assigned to pixels of an image to make the image wholly or partially lighter or darker. For example, image brightness adjustment may be performed through pixel value adjustment, histogram smoothing, contrast adjustment, color channel adjustment, and/or binarization. Without being limited thereto, image brightness adjustment may include preprocessing which is commonly understood to be image brightness adjustment.

Image noise removal means reducing or removing noise occurring in an image. For example, image noise removal may be performed through an average filter, a median filter, a Gaussian filter, and/or a deep-learning based filter. Without being limited thereto, image noise removal may include preprocessing which is commonly understood to be image noise removal.

Without being limited thereto, image preprocessing may include various types of preprocessing which may be performed on an image before the image is analyzed.

The preprocessed visible light image 125 may be an image generated by preprocessing the visible light image 115. For example, the preprocessed visible light image 125 may be generated by performing cropping, size adjustment, inversion, brightness adjustment, and/or noise removal on the visible light image 115, but is not limited thereto.

(3) Depth Image Generation Module 130

Referring to FIG. 1, the depth image generation module 130 may generate a depth image 135 on the basis of the visible light image 115.

The depth image generation module 130 may include a pre-trained depth map generation model.

The depth map generation model may be a model that is trained to estimate a depth value for at least one pixel included in an input image, to assign the estimated depth value to a pixel of an output image, and to finally generate a depth image corresponding to the input image. For example, the depth map generation model may be a model that is trained to estimate a depth value of an object represented by at least one pixel included in an input image, to assign the estimated depth value to a pixel of an output image, and to finally generate a depth image corresponding to the input image.

The generated depth image may be an image including 2D pixels. A pixel of the depth image may be assigned the estimated depth value for the object represented by the at least one pixel of the input image corresponding to each pixel. Alternatively, a pixel group of the depth image may be assigned the estimated depth value for the object represented by the at least one pixel of the input image corresponding to each pixel group.

The depth value may be a relative value. For example, the depth value may be a value between a predetermined minimum value and a predetermined maximum value. The depth value may be the maximum value when the object represented by the at least one pixel of the input image corresponding to the pixel of the depth image assigned the depth value is the closest object represented in the input image. The depth value may be the minimum value when the object represented by the at least one pixel of the input image corresponding to the pixel of the depth image assigned the depth value is the farthest object represented in the input image. The depth value may be a value closer to the maximum value when the object represented by the at least one pixel of the input image corresponding to the pixel of the depth image assigned the depth value is the closer object in the input image. The depth value may be a value closer to the minimum value when the object represented by the at least one pixel of the input image corresponding to the pixel of the depth image assigned the depth value is the farther object in the input image. Alternatively, the depth value may be the minimum value when the object represented by the at least one pixel of the input image corresponding to the pixel of the depth image assigned the depth value is the closest object represented in the input image. The depth value may be the maximum value when the object represented by the at least one pixel of the input image corresponding to the pixel of the depth image assigned the depth value is the farthest object represented in the input image. The depth value may be a value closer to the minimum value when the object represented by the at least one pixel of the input image corresponding to the pixel of the depth image assigned the depth value is the closer object in the input image. The depth value may be a value closer to the maximum value when the object represented by the at least one pixel of the input image corresponding to the pixel of the depth image assigned the depth value is the farther object in the input image. However, no limitation thereto is imposed.

The depth value may be an absolute value. For example, the depth value may be a value within a predetermined range. Herein, the depth value may be assigned an actual distance value from the camera to the object represented in the at least one pixel of the input image corresponding to the pixel of the depth image assigned the depth value.

In the meantime, the depth map generation model is not limited to the above-described examples, and may include various types of artificial neural network models commonly understood to be artificial neural network models that generate depth maps. For example, as the depth map generation model, a monocular depth estimation model that generates a depth map by using a single image may be used. Specifically, as the depth map generation model, the MIDAS (Monocular Depth Estimation with Image-Depth-Aware Self-Supervised Learning) model that estimates a relative depth may be used among monocular depth estimation models. Alternatively, as the depth map generation model, the ZoeDepth model that estimates an absolute depth may be used among monocular depth estimation models, but no limitation thereto is imposed.

Each pixel of the depth image 135 may be assigned the depth value estimated on the basis of the visible light image 115. For example, each pixel of the depth image 135 may be assigned the estimated depth value corresponding to the at least one pixel included in the visible light image 115. As another example, a pixel group of the depth image 135 may be assigned the estimated depth value corresponding to the at least one pixel included in the visible light image 115, but is not limited thereto.

The size of the depth image 135 may be the same as the size of the visible light image 115. For example, the number of pixels of the depth image 135 may be the same as the number of pixels of the visible light image 115. Without being limited thereto, the size of the depth image 135 may be smaller than the size of the visible light image 115, or the size of the depth image 135 may be greater than the size of the visible light image 115.

(4) Preprocessing Module 140

Referring to FIG. 1, the preprocessing module 140 may preprocess the depth image 135 to generate a preprocessed depth image 145.

Preprocessing may include image cropping, image size adjustment, lateral inversion of an image, image brightness adjustment, and/or image noise removal. Specific details of preprocessing have been described above with respect to the preprocessing module 120, so a redundant description will be omitted.

The preprocessed depth image 145 is an image generated by preprocessing the depth image 135. For example, the preprocessed depth image 145 may be generated by performing cropping, size adjustment, inversion, brightness adjustment, and/or noise removal on the depth image 135, but is not limited thereto.

FIGS. 2A, 2B, 2C and 2D are a diagram illustrating a visible light image 210 and a depth image 220 according to an embodiment.

Figure 2A:
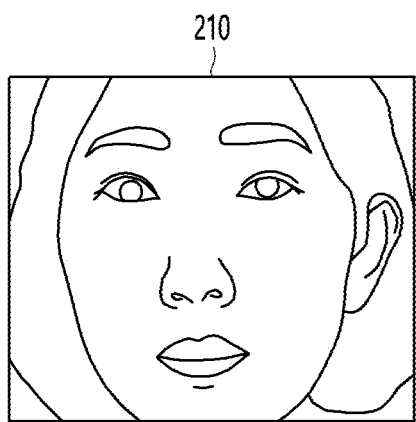
FIGS. 2A to 2D are a diagram illustrating a visible light image and a depth image according to an embodiment.

FIG. 2A shows the visible light image 210 generated by capturing the subject's face through the image capturing module 110 described above.

Figure 2B:
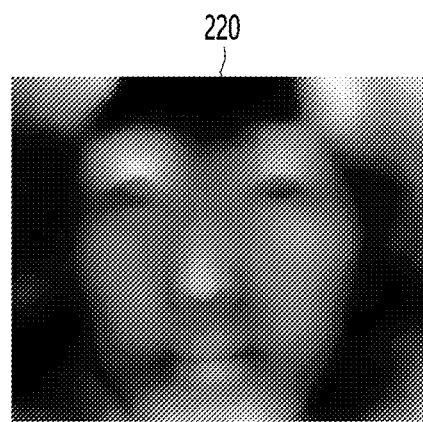

FIG. 2B shows the depth image 220 generated on the basis of the visible light image 210 by using the depth image generation module 130 described above. Referring to FIG. 2(b), it can be seen that each pixel of the depth image 220 is assigned a depth value estimated on the basis of the visible light image 210. Specifically, it can be seen that the closer an object represented by a pixel in the visible light image 210, the brighter a pixel of the depth image 220 corresponding thereto is displayed in color, and the farther an object represented by a pixel in the visible light image 210, the darker a pixel of the depth image 220 corresponding thereto is displayed in color.

Figure 2C:
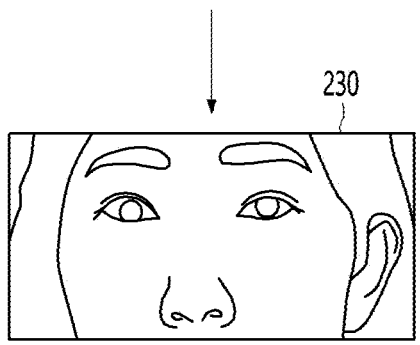

FIG. 2C shows the preprocessed visible light image 230 generated by preprocessing the visible light image 210 through the preprocessing module 120 described above. Referring to FIG. 2C, the preprocessed visible light image 230 means an image subjected to preprocessing of cropping a portion of the visible light image 210.

Figure 2D:
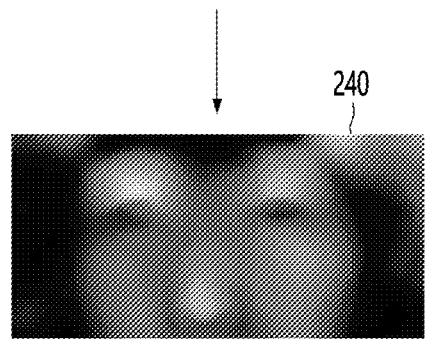

FIG. 2D shows the preprocessed depth image 240 generated by preprocessing the depth image 220 through the preprocessing module 140 described above. Referring to FIG. 2D, the preprocessed depth image 240 means an image subjected to preprocessing of cropping a portion of the depth image 220.

For example, the preprocessed depth image 240 may be generated by cropping the depth image 220 to a region corresponding to the preprocessed visible light image 230. In this case, the region corresponding to the preprocessed visible light image may mean a region in the depth image corresponding to a region for which the visible light image is cropped into the preprocessed visible light image. Specifically, the region corresponding to the preprocessed visible light image may mean a position of a pixel in the depth image corresponding to a position of a pixel for which the visible light image is cropped into the preprocessed visible light image, but is not limited thereto.

As another example, the preprocessed depth image 240 may be generated on the basis of the preprocessed visible light image 230 by using the depth image generation module 130, but the method of generating the preprocessed depth image is not limited thereto.

(5) Eye Protrusion Value Estimation Module 150

Referring back to FIG. 1, the eye protrusion value estimation module 150 may output an estimated eye protrusion value 155 on the basis of both the preprocessed visible light image 125 and the preprocessed depth image 145.

The eye protrusion value estimation module 150 may include a pre-trained eye protrusion value estimation model.

The eye protrusion value estimation model may be a model that is trained to receive a visible light image and a depth image to output an estimated eye protrusion value for the subject's eye represented in the visible light image.

For example, the eye protrusion value estimation model may be a model that is trained to receive a visible light image and a depth image to output an estimated eye protrusion value for the subject's left eye represented in the visible light image. As another example, the eye protrusion value estimation model may be a model trained to receive a visible light image and a depth image to output an estimated eye protrusion value for the subject's right eye represented in the visible light image. As still another example, the eye protrusion value estimation model may be a model trained to receive a visible light image and a depth image to output an estimated eye protrusion value for the subject's right eye and an estimated eye protrusion value for the subject's left eye represented in the visible light image.

The eye protrusion value estimation model may be trained using a visible light image, a depth image corresponding to the visible light image, and an eye protrusion value for the subject's eye represented in the visible light image as training data. In this case, the depth image may be generated on the basis of the visible light image using the depth image generation module.

For example, the eye protrusion value estimation model may be trained using a visible light image, a depth image corresponding to the visible light image, and an eye protrusion value for the subject's left eye represented in the visible light image as training data. As another example, the eye protrusion value estimation model may be trained using a visible light image, a depth image corresponding to the visible light image, and an eye protrusion value for the subject's right eye represented in the visible light image as training data. As still another example, the eye protrusion value estimation model may be trained using a visible light image, a depth image corresponding to the visible light image, an eye protrusion value for the subject's left eye represented in the visible light image, and an eye protrusion value for the subject's right eye represented in the visible light image as training data.

In the meantime, the eye protrusion value estimation model may be trained using a preprocessed visible light image, a preprocessed depth image, and an eye protrusion value for the subject's eye represented in the preprocessed visible light image as training data.

In this case, the preprocessed depth image may be generated by generating a depth image on the basis of a visible light image through the depth image generation module, and preprocessing the generated depth image. That is, the preprocessed depth image may be generated by preprocessing the depth image corresponding to the visible light image. Alternatively, the preprocessed depth image may be generated on the basis of the preprocessed visible light image through the depth image generation module, but is not limited thereto.

In order to increase the number of pieces of training data used to train the eye protrusion value estimation model, the visible light image may be laterally inverted to generate a laterally inverted visible light image, and the depth image may be laterally inverted to generate a laterally inverted depth image.

For example, when the eye protrusion value estimation model is an eye protrusion value estimation model for the left eye, a visible light image, a depth image, and an eye protrusion value for the subject's left eye represented in the visible light image may be used as training data, and a laterally inverted visible light image, a laterally inverted depth image, and an eye protrusion value for the subject's right eye represented in the visible light image may be used as training data. As another example, when the eye protrusion value estimation model is an eye protrusion value estimation model for the right eye, a visible light image, a depth image, and an eye protrusion value for the subject's right eye represented in the visible light image may be used as training data, and a laterally inverted visible light image, a laterally inverted depth image, and an eye protrusion value for the subject's left eye represented in the visible light image may be used as training data. As still another example, when the eye protrusion value estimation model is an eye protrusion value estimation model for both the right eye and the left eye, a visible light image, a depth image, an eye protrusion value for the subject's right eye represented in the visible light image, and an eye protrusion value for the subject's left eye represented in the visible light image may be used as training data, and a laterally inverted visible light image, a laterally inverted depth image, an eye protrusion value for the subject's left eye represented in the visible light image, and an eye protrusion value for the subject's right eye represented in the visible light image may be used as training data.

The eye protrusion value estimation model may mean a model trained using machine learning. Herein, machine learning may be understood as a comprehensive concept that includes an artificial neural network and, further, deep-learning. As an algorithm of the eye protrusion value estimation model, at least one of the following may be used: k-nearest neighbors, linear regression, logistic regression, support vector machine (SVM), decision tree, random forest, and neural network. Herein, as the neural network, at least one of the following may be selected: an artificial neural network (ANN), time delay neural network (TDNN), deep neural network (DNN), convolution neural network (CNN), recurrent neural network (RNN), long short-term Memory (LSTM), and residual neural network (ResNet).

Figure 3:
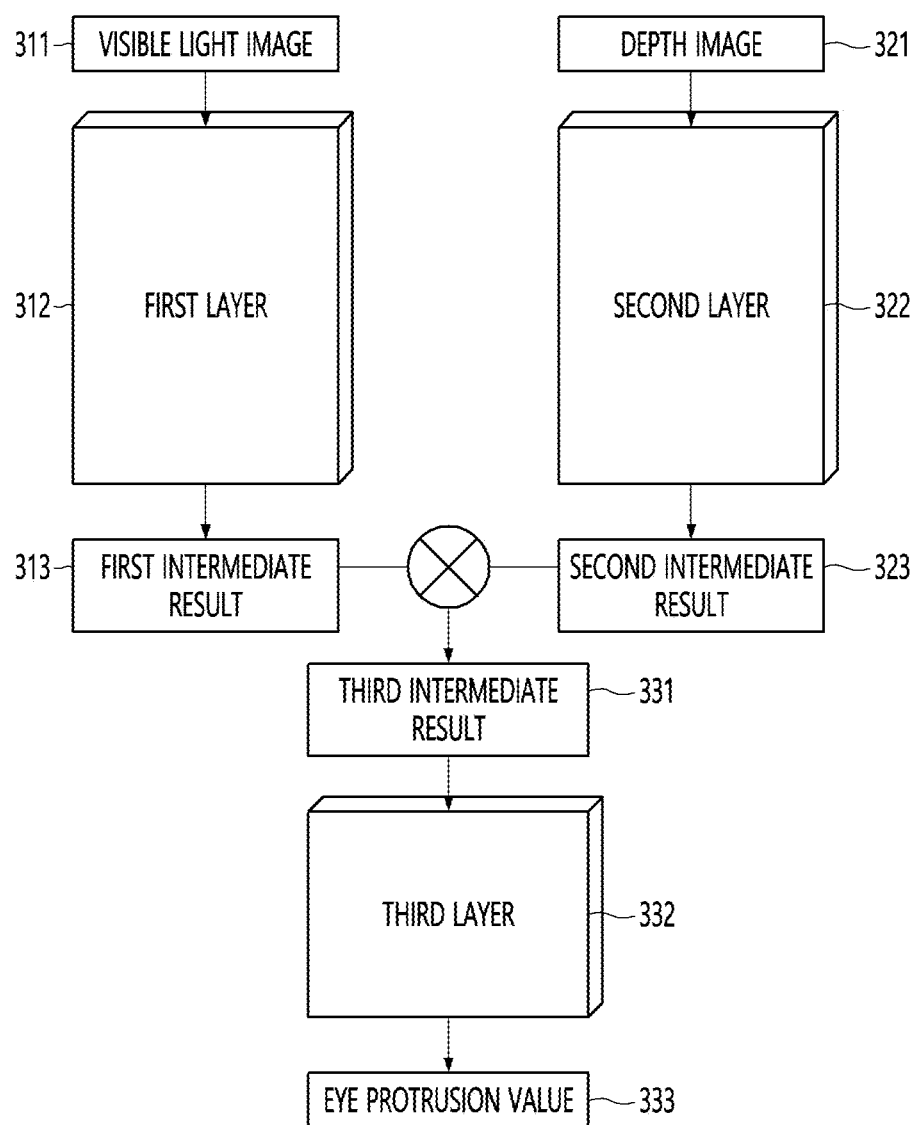
FIG. 3 is a diagram illustrating an eye protrusion value estimation model according to an embodiment.

FIG. 3 is a diagram illustrating a structure of an eye protrusion value estimation model according to an embodiment.

Referring to FIG. 3, the eye protrusion value estimation model may include a first layer 312, a second layer 322, and a third layer 332.

The first layer 312 may process a visible light image 311 to output a first intermediate result 313.

The second layer 322 may process a depth image 321 to output a second intermediate result 323.

A third intermediate result 331 may be output by concatenating the first intermediate result 313 and the second intermediate result 323.

The third layer 332 may process the third intermediate result 331 to output an eye protrusion value 333.

Although not shown in FIG. 3, the first layer 312 may include a plurality of layers. For example, the first layer 312 may include a plurality of convolution layers. As another example, the first layer 312 may have a first ResNet structure, but is not limited thereto.

Although not shown in FIG. 3, the second layer 322 may include a plurality of layers. For example, the second layer 322 may include a plurality of convolution layers. As another example, the second layer 322 may have a second ResNet structure. As still another example, the second layer may have the first ResNet structure, but is not limited thereto.

Although not shown in FIG. 3, the third layer 332 may include a plurality of layers. For example, the third layer 332 may include a plurality of convolution layers. As still another example, the third layer 332 may have a third ResNet structure, but is not limited thereto.

As described above, an eye protrusion value may be estimated using the image capturing module 110, the preprocessing module 120, the depth image generation module!30, the preprocessing module 140, and the eye protrusion value estimation module 150. No limitation thereto is imposed, and at least one module may be omitted.

(6) Variations

Figure 4:
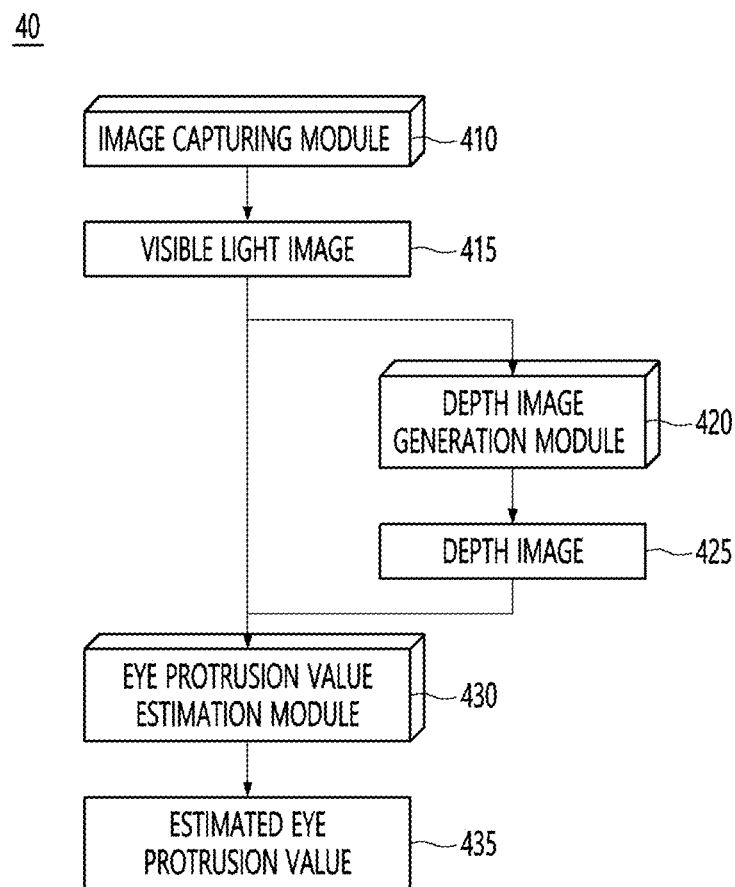
FIG. 4 is a diagram illustrating a process of estimating an eye protrusion value according to an embodiment.

FIG. 4 is a diagram illustrating a process of estimating an eye protrusion value according to an embodiment.

Referring to FIG. 4, in order to estimate an eye protrusion value, an image capturing module 410, a depth image generation module 420, and an eye protrusion value estimation module 430 may be used. That is, a preprocessing module may not be used to estimate an eye protrusion value.

The image capturing module 410 may generate a visible light image 415. Specific details of the image capturing module and the visible light image have been described above in (1) Image Capturing Module, so a redundant description will be omitted.

The depth image generation module 420 may generate a depth image 425 on the basis of the visible light image 415. Specific details of the depth image generation module and the depth image have been described above in (3) Depth Image Generation Module, so a redundant description will be omitted.

The eye protrusion value estimation module 430 may output an eye protrusion value 435 estimated on the basis of both the visible light image 415 and the depth image 425. Specific details of the eye protrusion value estimation module and the estimated eye protrusion value have been described above in (5) Eye Protrusion Value Estimation Module, so a redundant description will be omitted.

Figure 5:
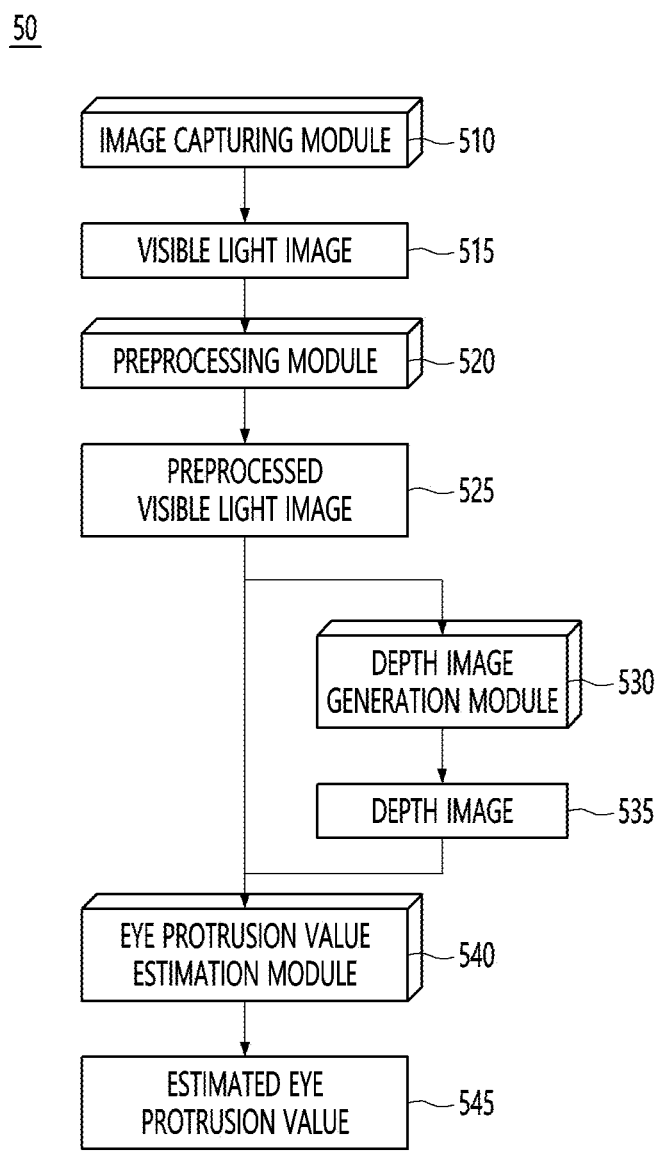
FIG. 5 is a diagram illustrating a process of estimating an eye protrusion value according to an embodiment.

FIG. 5 is a diagram illustrating a process of estimating an eye protrusion value according to an embodiment.

Referring to FIG. 5, in order to estimate an eye protrusion value, an image capturing module 510, a preprocessing module 520, a depth image generation module 530, and an eye protrusion value estimation module 540 may be used. That is, a preprocessing module for a depth image 535 may not be used to estimate an eye protrusion value.

The image capturing module 510 may generate a visible light image 515. Specific details of the image capturing module and the visible light image have been described above in (1) Image Capturing Module, so a redundant description will be omitted.

The preprocessing module 520 may preprocess the visible light image 515 to generate a preprocessed visible light image 525. Specific details of preprocessing have been described above in (2) Preprocessing Module, so a redundant description will be omitted.

The depth image generation module 530 may generate the depth image 535 on the basis of the preprocessed visible light image 525. Specific details of the depth image generation module and the depth image have been described above in (3) Depth Image Generation Module, so a redundant description will be omitted.

The eye protrusion value estimation module 540 may output an estimated eye protrusion value 545 on the basis of both the preprocessed visible light image 525 and the depth image 535. Specific details of the eye protrusion value estimation module and the estimated eye protrusion value have been described above in (5) Eye Protrusion Value Estimation Module, so a redundant description will be omitted.

(7) System

Figure 6:
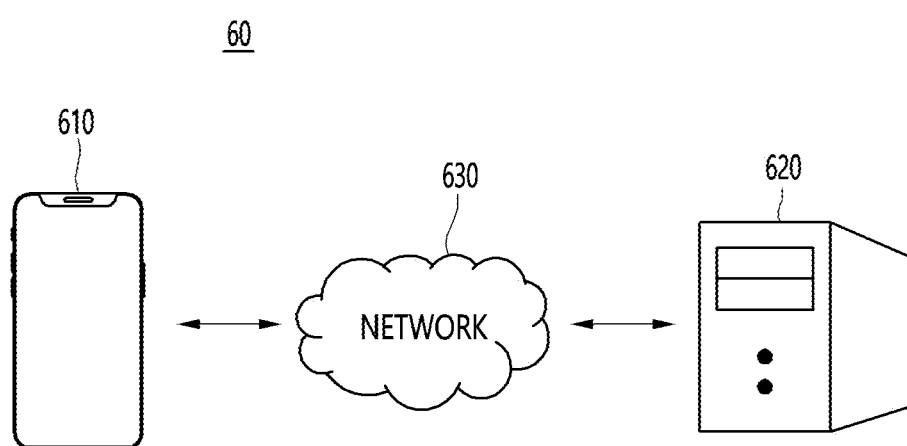
FIG. 6 is a diagram illustrating a system for estimating an eye protrusion value according to an embodiment.

FIG. 6 is a diagram illustrating a system for estimating an eye protrusion value according to an embodiment.

The system for estimating an eye protrusion value may include a mobile device 610 of a user, and a server 620.

The mobile device 610 is a device for interacting directly and/or indirectly with a user.

The mobile device 610 may include an image capturing module, a user interface, a communication device, a memory, and a processor.

The image capturing module of the mobile device 610 may include a camera module. Specific details of the image capturing module have been described above in (1) Image Capturing Module, so a redundant description will be omitted.

The user interface of the mobile device 610 may output various types of information according to control commands of the processor of the mobile device 610. The user interface of the mobile device 610 may include a display for outputting information visually to the user. The user interface of the mobile device 610 may include a speaker for outputting information audibly to the user. The user interface of the mobile device 610 may receive various types of information from the user. The user may input various types of information through the user interface of the mobile device 610. The user interface of the mobile device 610 may include an input device, such as a keyboard, a mouse, and/or a touch screen.

The communication device of the mobile device 610 may transmit and/or receive data and/or information from the outside through wired and/or wireless communication. The communication device may perform bi-directional or unidirectional communication.

The communication device of the mobile device 610 may include a wireless communication module and/or a wired communication module. The wireless communication module may include a Wi-Fi communication module and/or a cellular communication module.

The memory of the mobile device 610 may store various processing programs, parameters for performing processing of the programs, or data resulting from such processing. For example, the memory of the mobile device 610 may store an instruction, an algorithm, and/or an executable code for the operation of the processor of the mobile device 610, which will be described later.

The memory of the mobile device 610 may store a visible light image captured through the image capturing module. Specific details of the visible light image have been described above in (1) Image Capturing Module, so a redundant description will be omitted.

The memory of the mobile device 610 may store a preprocessed visible light image, a depth image, a preprocessed depth image, and/or an estimated eye protrusion value generated according to the operation of the processor of the mobile device 610, which will be described later. Specific details of the preprocessed visible light image have been described above in (2) Preprocessing Module, so a redundant description will be omitted. Specific details of the depth image have been described above in (3) Depth Image Generation Module, so a redundant description will be omitted. Specific details of the preprocessed depth image have been described above in (4) Preprocessing Module, so a redundant description will be omitted. Specific details of the estimated eye protrusion value have been described above in (5) Eye Protrusion Value Estimation Module, so a redundant description will be omitted.

The memory of the mobile device 610 may be realized as a non-volatile semiconductor memory, a hard disk drive (HDD), a solid-state disk (SSD), a silicon disk drive (SDD), a flash memory, a random-access memory (RAM), a read-only memory (ROM), an electrically erasable programmable read-only memory (EEPROM), or other types of tangible non-volatile recording media.

The processor of the mobile device 610 may control the overall operation of the mobile device 610, and may operate according to the instruction, the algorithm, and/or the executable code stored in the memory of the mobile device 610.

The processor of the mobile device 610 may obtain a visible light image. For example, the mobile device 610 may capture and obtain a visible light image using the image capturing module. Specific details of the visible light image have been described above in (1) Image Capturing Module, so a redundant description will be omitted. As another example, without using the image capturing module, the mobile device 610 may obtain a visible light image in the form of receiving the visible light image stored in an external storage medium through an input/output interface.

The processor of the mobile device 610 may perform the operation of the preprocessing module. Specifically, the processor of the mobile device 610 may preprocess a visible light image to generate a preprocessed visible light image. Specific details of the preprocessing module have been described above in (2) Preprocessing Module, so a redundant description will be omitted.

The processor of the mobile device 610 may perform the operation of the depth image generation module. Specifically, the processor of the mobile device 610 may generate a depth image on the basis of a visible light image. Specific details of the depth image generation module have been described above in (3) Depth Image Generation Module, so a redundant description will be omitted.

The processor of the mobile device 610 may perform the operation of the preprocessing module. Specifically, the processor of the mobile device 610 may preprocess a depth image to generate a preprocessed depth image. Specific details of the preprocessing module have been described above in (4) Preprocessing Module, so a redundant description will be omitted.

The processor of the mobile device 610 may perform the operation of the eye protrusion value estimation module. Specifically, the processor of the mobile device 610 may estimate an eye protrusion value on the basis of both a preprocessed visible light image and a preprocessed depth image. Specific details of the eye protrusion value estimation module have been described above in (5) Eye Protrusion Value Estimation Model, so a redundant description will be omitted.

The processor of the mobile device 610 may use the communication device of the mobile device 610 to perform data transmission to the server 620 and/or data reception from the server 620 over a network 630. Without being limited thereto, the processor of the mobile device 610 may use the communication device of the mobile device 610 to perform data transmission and/or reception directly with the server 620.

The processor of the mobile device 610 may be realized as a central processing unit (CPU), a graphics processing unit (GPU), a digital signal processor (DSP), a state machine, an application specific integrated circuit (ASIC), a radio-frequency integrated circuit (RFIC), and a combination thereof.

The mobile device 610 may include a smartphone, a tablet PC, a desktop, a laptop computer, and/or a digital camera.

The server 620 may include a communication device, a memory, and a processor.

The communication device of the server 620 may transmit and/or receive data and/or information from the outside through wired and/or wireless communication. The communication device may perform bi-directional or uni-directional communication.

The communication device of the server 620 may include a wireless communication module and/or a wired communication module. The wireless communication module may include a Wi-Fi communication module and/or a cellular communication module.

The memory of the server 620 may store various processing programs, parameters for performing processing of the programs, or data resulting from such processing. For example, the memory of the server 620 may store an instruction, an algorithm, and/or an executable code for the operation of the processor of the server 620, which will be described later.

The memory of the server 620 may store a visible light image, a preprocessed visible light image, a depth image, a preprocessed depth image, and an estimated eye protrusion value obtained from the mobile device 610.

The memory of the server 620 may be realized as a non-volatile semiconductor memory, a HDD, an SSD, an SDD, a flash memory, a RAM, a ROM, an EEPROM, or other types of tangible non-volatile recording media.

The processor of the server 620 may control the overall operation of the server 620, and may operate according to the instruction, the algorithm, and/or the executable code stored in the memory of server 620.

The processor of the server 620 may use the communication device of the server 620 to perform data transmission to the mobile device 610 and/or data reception from the mobile device 610 over the network 630. Without being limited thereto, the processor of the server 620 may use the communication device of the server 620 to perform data transmission and/or reception directly with the mobile device 610.

The processor of the server 620 may be realized as a central processing unit, a graphics processing unit, a digital signal processor, a state machine, an application specific integrated circuit, a radio-frequency integrated circuit, and a combination thereof.

In the meantime, the operations of the preprocessing module, the depth image generation module, and the eye protrusion value estimation module have been described above as being performed on the mobile device 610, but at least one of the preprocessing module, the depth image generation module, and the eye protrusion value estimation module may be performed on the server 620.

For example, when the mobile device 610 uses the preprocessing module to generate a preprocessed visible light image, uses the depth image generation module to generate a depth image, uses the preprocessing module to generate a preprocessed depth image, and transmits the preprocessed visible light image and the preprocessed depth image to the server 620, the server 620 may use the eye protrusion value estimation module to estimate an eye protrusion value.

As another example, when the mobile device 610 transmits a visible light image to the server 620, the server 620 may use the preprocessing module to generate a preprocessed visible light image, may use the depth image generation module to generate a depth image, may use the preprocessing module to generate a preprocessed depth image, and may use the eye protrusion value estimation module to generate an eye protrusion value.

2. Method for Estimating Eye Protrusion Value

Figure 7:
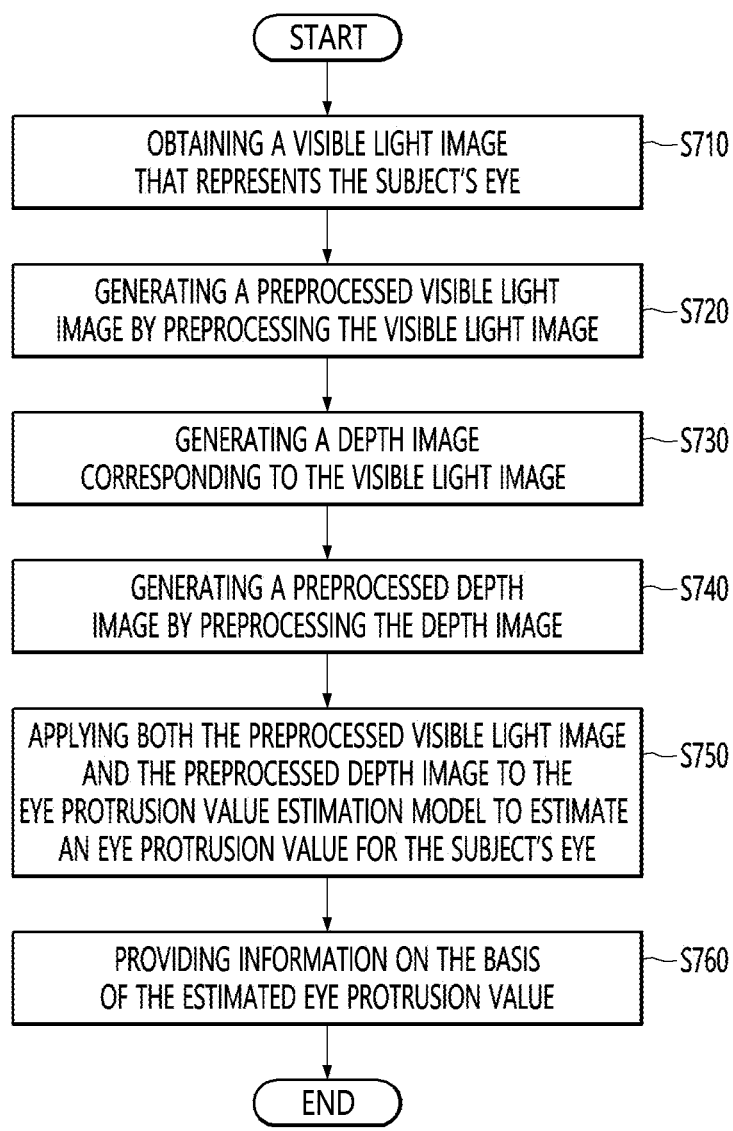
FIG. 7 is a flowchart illustrating a process of estimating an eye protrusion value according to an embodiment.

FIG. 7 is a flowchart illustrating a process of estimating an eye protrusion value according to an embodiment.

Referring to FIG. 7, a method for estimating an eye protrusion value for a subject may include obtaining a visible light image that represents the subject's eye in step S710, generating a preprocessed visible light image by preprocessing the visible light image in step S720, generating a depth image corresponding to the visible light image in step S730, generating a preprocessed depth image by preprocessing the depth image in step S740, applying both the preprocessed visible light image and the preprocessed depth image to the eye protrusion value estimation model to estimate an eye protrusion value for the subject's eye in step S750, and providing information on the basis of the estimated eye protrusion value in step S760.

(1) Obtaining Visible Light Image in Step S710

The visible light image for the subject may be obtained.

For example, the visible light image may be obtained through the image capturing module. Specific details of the image capturing module and the visible light image have been described above in (1) Image Capturing Module of 1. Eye Protrusion Value Estimation System, so a redundant description will be omitted. As another example, the visible light image may be a visible light image that was captured at any time point in the past and stored in the mobile device. As still another example, the visible light image may be a visible light image that is received from an external device and stored in the mobile device. The method of obtaining the visible light image is not limited to the above-described examples, and may be obtained in a variety of ways.

The visible light image may represent at least a portion of the subject's facial region. The facial region may mean a region including the subject's eyes, eyebrows, forehead, nose, nasal bridge, mouth, chin, and/or ears. Without being limited thereto, the facial region may mean a region recognized as a face when the subject's face is viewed from the front. An entire facial region may mean a region including all the subject's eyes, eyebrows, forehead, nose, nasal bridge, mouth, chin, and ears. Without being limited thereto, the entire facial region may mean the entire region recognized as a face when the subject's face is viewed from the front. In the meantime, depending on the subject's facial shape, and the distance between the subject's face and the image capturing module, the entire facial region may not include the subject's ears.

For example, the visible light image may represent one of the subject's eyes. As another example, the visible light image may represent one of the subject's eyes and the nasal bridge. As still another example, the visible light image may represent both of the subject's eyes and the nasal bridge. As yet still another example, the visible light image may represent one of the subject's eyes and one eyebrow. As yet still another example, the visible light image may represent one of the subject's eyes, one eyebrow, and the nasal bridge. As yet still another example, the visible light image may represent both of the subject's eyes, both eyebrows, and the nasal bridge. As yet still another example, the visible light image may represent the facial region between the subject's chin and the subject's eyebrows. Without being limited thereto, the visible light image may represent the entire facial region including at least one of the subject's eyes.

The visible light image may be an image satisfying an analysis condition.

The analysis condition means a condition of a visible light image that is suitable for estimating an eye protrusion value.

For example, the analysis condition may include at least one of the following: the visible light image represents the subject's eye, the subject's eye represented in the visible light image is positioned in a predetermined eye region, the subject's pupil represented in the visible light image is positioned in a predetermined pupil region, the subject's face represented in the visible light image is positioned in a predetermined facial region, the face represented in the visible light image faces forward, the horizontal rotation angle of the face represented in the visible light image is within a predetermined horizontal angle range, the vertical rotation angle of the face represented in the visible light image is within a predetermined vertical angle range, the horizontal tilt of the face represented in the visible light image is within a predetermined tilt angle range, the degree of smile on the face represented in the visible light image is within a predetermined smile level, the subject's nose is represented in the visible light image, the subject's mouth is represented in the visible light image, the subject's chin is represented in the visible light image, the brightness of the visible light image is within a predetermined brightness range, the contrast of the visible light image is within a predetermined contrast range, and the degree of blurriness of the visible light image is within a predetermined blurriness range. However, no limitation thereto is imposed.

Hereinafter, the subject means a person who is captured, and the user means a person who manipulates the mobile device. Hereinafter, a description will be made distinguishing the subject and the user, but the subject and the user may be the same person. That is, the user may capture himself or herself.

In order to obtain a visible light image satisfying the analysis condition, a capturing guide may be provided to the user.

For example, a capturing guide for the user to adjust the position and/or the angle of the mobile device while using the mobile device to capture the subject may be provided. As another example, a capturing guide for the user to adjust the position and/or the angle of the mobile device after using the mobile device to capture the subject may be provided. As still another example, a capturing guide for the user to adjust the position and/or the angle of the subject while using the mobile device to capture the subject may be provided. As yet still another example, a capturing guide for the user to adjust the position and/or the angle of the subject after using the mobile device to capture the subject may be provided. As yet still another example, a capturing guide for the user to adjust the brightness of the surrounding environment and/or the brightness of the lighting while using the mobile device to capture the subject may be provided. As yet still another example, a capturing guide for the user to adjust the brightness of the surrounding environment and/or the brightness of the lighting after using the mobile device to capture the subject may be provided.

As a specific example, a capturing guide may be provided in the form of a guide line together with a preview image on the display of the mobile device. As another specific example, a capturing guide may be provided in the form of text on the display of the mobile device. As still another example, a capturing guide may be provided in the form of voice through the speaker of the mobile device.

Providing a capturing guide is not limited to the above-described examples, and may be provided in a variety of forms to give guidance to the user and/or the subject to ensure that the visible light image satisfies the analysis condition.

Figure 8:
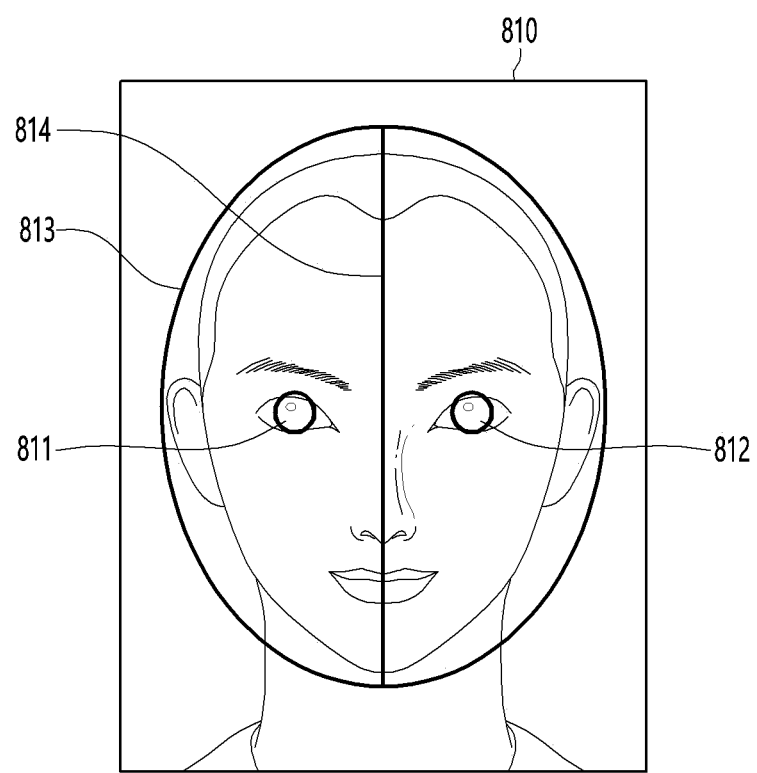
FIG. 8 is a diagram illustrating a capturing guide according to an embodiment.

FIG. 8 is a diagram illustrating a capturing guide according to an embodiment.

Referring to FIG. 8, a first guide 811, a second guide 812, a third guide 813, and a fourth guide 814 may be provided together with a preview image 810 through the display of the mobile device.

The first guide 811 may be output to indicate an appropriate position of the subject's right eye. The second guide 812 may be output to indicate an appropriate position of the subject's left eye. The third guide 813 may be output to indicate an appropriate coverage proportion for the subject's face. The fourth guide 814 may be output to indicate an appropriate horizontal rotation angle of the subject's face.

The first guide 811 may be output to directly or indirectly indicate the appropriate position of the subject's right eye. For example, the first guide 811 may be output at the position at which the subject's right eye needs to be positioned, thereby helping the user to align the subject's right eye with the first guide 811. The first guide 811 may have, as shown in FIG. 8, a shape that indicates the outline of the iris region when the subject's eye is at the appropriate position. Alternatively, the first guide 811 may have a shape that indicates the position of the pupil or the subject's eye outline when the subject's eye is at the appropriate position.

The second guide 812 may be output to directly or indirectly indicate the appropriate position of the subject's left eye. For example, the second guide 812 may be output at the position at which the subject's left eye needs to be positioned, thereby helping the user to align the subject's left eye with the second guide 812. The second guide 812 may have, as shown in FIG. 8, a shape that indicates the outline of the iris region when the subject's eye is at the appropriate position. Alternatively, the second guide 812 may have a shape that indicates the position of the pupil or the subject's eye outline when the subject's eye is at the appropriate position.

The third guide 813 may be output to directly or indirectly indicate the appropriate proportion (portion) that the subject's face makes up in the image. The third guide 813 may indicate the region in which the subject's face needs to be positioned in a circular shape, or may indicate the distance between the subject's face and the mobile device so as to give guidance such that an image representing the subject's face in the appropriate proportion in the image is captured.

The fourth guide 814 may be output to directly or indirectly indicate the horizontal rotation angle of the subject's face. The fourth guide 814 may indicate the horizontal rotation angle of the face numerically, or may indicate the horizontal rotation angle of the face as a vertical line extending in the vertical direction of the display. Herein, the vertical line may be a vertical line that passes through the region at which the nose in the face needs to be positioned when both of the subject's eyes respectively correspond to the first guide 811 and the second guide 812 and the horizontal rotation angle of the face is 0 degrees.

The first guide 811 and the second guide 812 may be symmetrically provided on the display. The first guide 811 and the second guide 812 may be provided to be symmetrical with respect to the fourth guide 814.

Figure 9A:
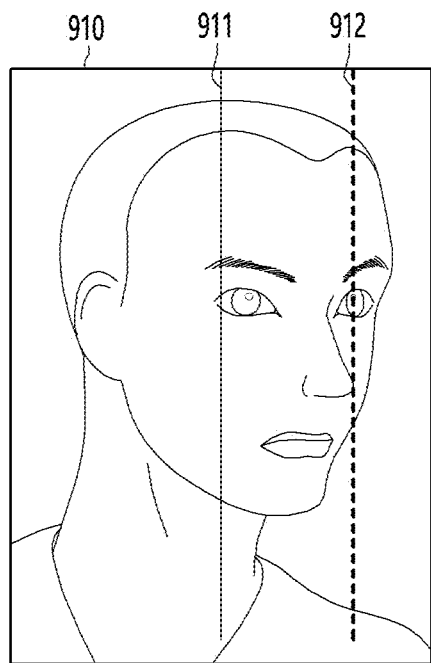
FIGS. 9A and 9B are a diagram illustrating a capturing guide according to an embodiment.
Figure 9B:
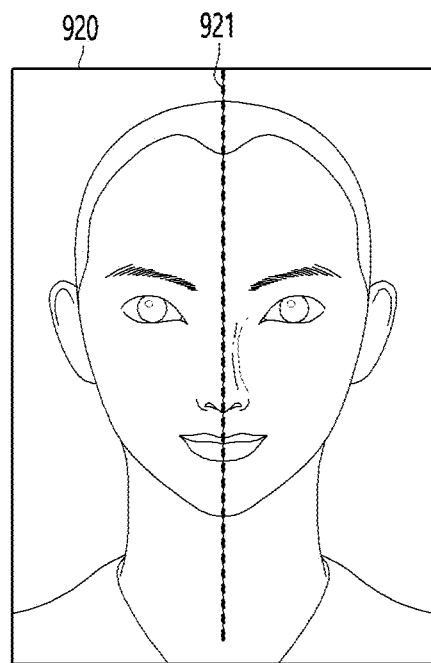

FIGS. 9A and 9B are a diagram illustrating a capturing guide according to an embodiment.

Referring to FIG. 9A, a fourth guide 911 and a fifth guide 912 may be provided together with a preview image 910.

The fourth guide 911 is a fixed capturing guide, and may be provided regardless of the state of the preview image. According to FIG. 9A, the fourth guide 911 for indicating the horizontal rotation angle of the subject's face may be provided in the form of a vertical line.

The fifth guide 912 is a real-time capturing guide, and may be generated on the basis of information obtained by analyzing the preview image. According to FIG. 9(a), the preview image 910 is analyzed to compute the horizontal rotation angle of the face, and the fifth guide 912 corresponding to the computed horizontal rotation angle of the face may be provided.

The real-time capturing guide may be provided in the shape corresponding to the fixed capturing guide. For example, when the fixed capturing guide is in the shape of a vertical line, the real-time capturing guide corresponding to the fixed capturing guide may also be in the shape of a vertical line. As another example, when the fixed capturing guide is in a circular shape, the real-time capturing guide corresponding to the fixed capturing guide may also be in a circular shape.

According to FIG. 9A, the horizontal rotation angle of the face in the preview image 910 does not satisfy a condition, so guidance to satisfy the condition may be provided. For example, the expression "Mover your face side to side to align the vertical centerline with the center line" may be displayed on the display or a guidance voice may be provided through the speaker.

FIG. 9B shows the state in which the horizontal rotation angle of the subject's face satisfies the condition. As shown in FIG. 9B, it may be determined that the condition is satisfied when the fourth guide and the fifth guide 921 provided together with the preview image 920 are aligned with each other.

In FIGS. 9A and 9B, the fixed capturing guide and the real-time capturing guide are shown as the vertical lines for giving guidance about the horizontal rotation angle of the subject's face, but are not limited thereto. The fixed capturing guide and the real-time capturing guide in appropriate forms may be provided depending on the capturing guides to be provided.

Figure 10:
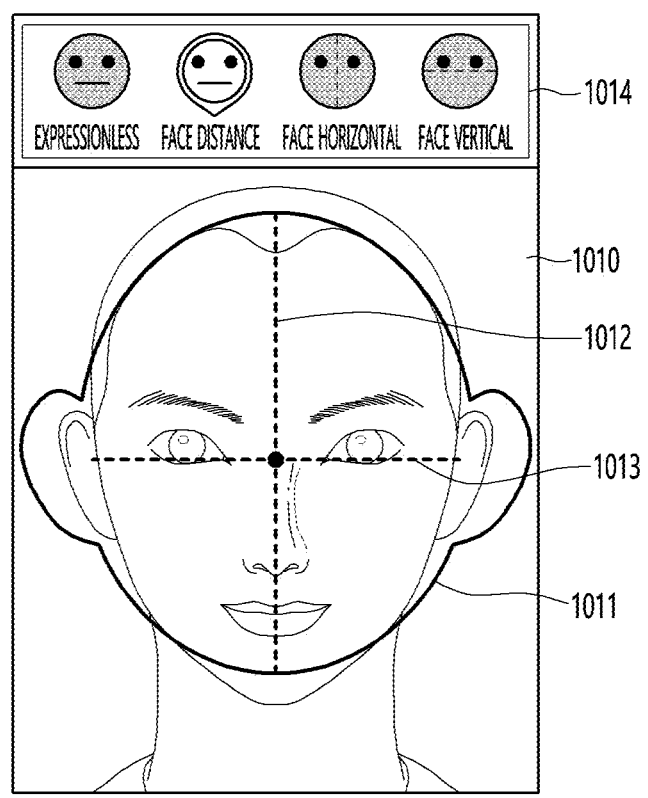
FIG. 10 is a diagram illustrating a capturing guide according to an embodiment.

FIG. 10 is a diagram illustrating a capturing guide according to an embodiment.

Referring to FIG. 10, a third guide 1011, a fourth guide 1012, a sixth guide 1013, and an icon guide 1014 may be provided together with a preview image 1010 through the display of the mobile device.

The third guide 1011 may be output to directly or indirectly indicate the appropriate proportion (portion) that the subject's face makes up in the image. The third guide 1011 may indicate the region in which the subject's face needs to be positioned in a circular, elliptical and/or facial shape, or may indicate the distance between the subject's face and the mobile device so as to give guidance such that an image representing the subject's face in the appropriate proportion in the image is captured.

The third guide 1011 may be indicated by the shape of the face including the outlines of the ears. Compared to the elliptical shape not expressing the outlines of the ears, the third guide 1011 expressing the outlines of the ears is indicated, so guidance is given for the subject to face forward, thereby more easily obtaining an image satisfying the condition in which the vertical rotation angle and the horizontal rotation angle of the subject's face are 0 degrees.

The fourth guide 1012 may be output to directly or indirectly indicate the horizontal rotation angle of the subject's face. The fourth guide 1012 may indicate the horizontal rotation angle of the face numerically, or may indicate the horizontal rotation angle of the face as a vertical line extending in the vertical direction of the display. Herein, the vertical line may be a vertical line that passes through the region at which the nose in the face needs to be positioned when the horizontal rotation angle of the face is 0 degrees.

The sixth guide 1013 may be output to directly or indirectly indicate the vertical rotation angle of the subject's face. The sixth guide 1013 may indicate the vertical rotation angle of the face numerically, or may indicate the vertical rotation angle of the face as a horizontal line extending in the horizontal direction of the display. Herein, the horizontal line may be a horizontal line that passes through the region at which the nose in the face needs to be positioned when the vertical rotation angle of the face is 0 degrees.

Referring to FIG. 10, the icon guide 1014 indicating whether the face in the preview image 1010 satisfies the analysis condition may be provided. For example, as shown in FIG. 10, when the horizontal rotation angle of the face satisfies the condition, the icon guide 1014 may indicate that the horizontal rotation angle of the face satisfies the condition. When the proportion that the face makes up in the image is inappropriate, the icon guide 1014 may indicate that the appropriate distance of the face does not satisfy the condition. Through the display of the icon guide 1014, the user and/or the subject may easily recognize whether the analysis condition is satisfied.

One visible light image may be obtained.

Alternatively, two or more visible light images may be obtained to estimate an accurate eye protrusion value consistently. For example, three visible light images may be obtained.

As will be described later, when two or more visible light images are obtained, an eye protrusion value may be estimated for each of the visible light images and an average value of the estimated values may be estimated as a final eye protrusion value. In this way, when an eye protrusion value is estimated with an average value using several visible light images, a more accurate eye protrusion value may be estimated because an error may be reduced, compared to using only one visible light image. In addition, in estimating an eye protrusion value, it is most important to implement a system with high accuracy. However, it is realistically impossible to have a 100% correct answer rate, so a system that has a constant difference from the correct answer or a constant direction of the difference from the correct answer may be evaluated as a better system. Thus, the applicant proposes that 'several photographs per day are obtained and each of the photographs is analyzed' to extract an eye protrusion value corresponding to a day as a representative value of the photographs, and the eye protrusion value is estimated on a daily basis or a weekly basis. Accordingly, the eye protrusion values between days or weeks have a relatively high consistency, compared to analyzing one photograph per day. An experiment related to this is described later in the eighth experimental example.

When visible light images are obtained, a step for estimating an eye protrusion value for each of the obtained visible light images may take place. Specifically, steps S720, S730, S740, and S750, which will be described later, may take place for each of the obtained visible light images.

Hereinafter, steps S720, S730, S740, and S750 will be described in detail.

(2) Generating Preprocessed Visible Light Image by Processing Visible Light Image in Step S720

A preprocessed visible light image may be generated by preprocessing the obtained visible light image. For example, the visible light image may be preprocessed using the preprocessing module. Specific details of the preprocessing module and the preprocessed visible light image have been described above in (2) Preprocessing Module of 1. Eye Protrusion Value Estimation System, so a redundant description will be omitted.

A preprocessed visible light image representing the subject's face that makes up a large proportion may be generated by preprocessing the visible light image representing the subject's face and the background. Alternatively, a preprocessed visible light image representing a partial facial region of the subject may be generated by preprocessing the visible light image representing the subject's entire facial region.

For example, a preprocessed visible light image representing the facial region between the subject's eyebrows and the subject's chin may be generated by cropping the visible light image representing the subject's entire facial region. As another example, a preprocessed visible light image representing the facial region between the subject's eyebrows and the tip of the nose may be generated by cropping the visible light image representing the subject's entire facial region. As still another example, a preprocessed visible light image representing the subject's both eye regions and the nasal bridge region may be generated by cropping the visible light image representing the subject's entire facial region. As yet still another example, a preprocessed visible light image representing one of the subject's eye regions and the nasal bridge region may be generated by cropping the visible light image representing the subject's entire facial region. As yet still another example, a preprocessed visible light image representing one of the subject's eye regions may be generated by cropping the visible light image representing the subject's entire facial region. The method of cropping the visible light image is not limited to the above-described examples, and cropping into an image including an appropriate facial region may be performed to estimate an eye protrusion value.

In the meantime, estimating an eye protrusion value by using an image including both eyes and/or nasal bridge may further improve the accuracy of the estimated eye protrusion value. For example, preprocessing a visible light image such that the preprocessed visible light image includes the both eyes and/or nasal bridge may further improve the accuracy of estimating the eye protrusion value.

This is because, in order to analyze a distance or perspective accurately, such as a relative depth value, it is better for an image to be analyzed to have as large a region as possible. In addition, the accuracy of estimating an eye protrusion value may be improved when the preprocessed visible light image includes the both eyes, considering the fact that exophthalmos often causes only one eye to protrude and the left region and the right region of the face are similar. In addition, the accuracy of estimating an eye protrusion value may be improved by including the nasal bridge which may be a comparison subject in estimating a relative depth value of an eyeball including the nasal bridge. Experimental results related to this are described in the first experimental example to the fifth experimental example of 4. Experimental Examples about Eye Protrusion Value Estimation Model, which will be described below.

Figure 11A:
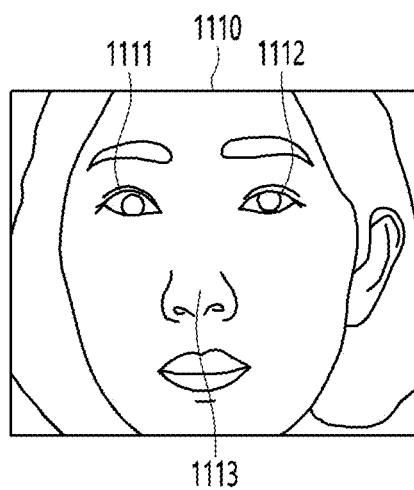
FIGS. 11A and 11B are diagrams illustrating a method of preprocessing a visible light image according to an embodiment.
Figure 11B:
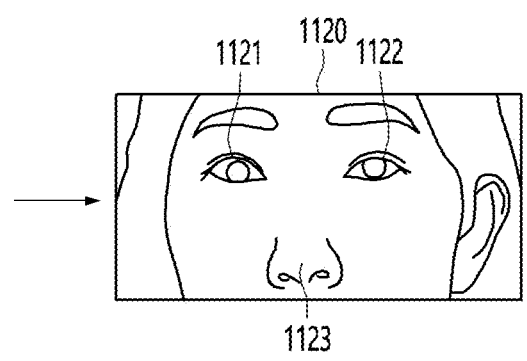

FIGS. 11A and 11B are diagrams illustrating a method of preprocessing a visible light image according to an embodiment.

Referring to FIGS. 11A and 11B, a visible light image 1110 may represent the subject's facial region. Specifically, the entire facial region including the subject's right eye 1111, the subject's left eye 1112, and the subject's nasal bridge 1113 may be represented.

As shown in FIGS. 11A and 11B, the visible light image 1110 may be preprocessed to generate a preprocessed visible light image 1120. Specifically, the visible light image 1110 may be cropped to generate the preprocessed visible light image 1120.

The preprocessed visible light image 1120 may represent the partial facial region including the subject's right eye 1121, the subject's left eye 1122, and the subject's nasal bridge 1123.

That is, according to an embodiment, a visible light image 1120 representing a partial facial region may be generated by preprocessing the visible light image 1110 representing the entire facial region.

Figures 12A, 12B:
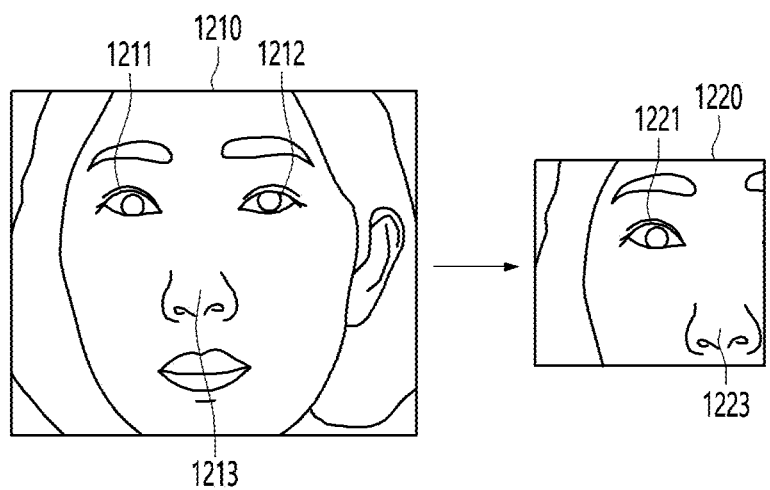
FIGS. 12A and 12B are diagrams illustrating a method of preprocessing a visible light image according to an embodiment.

FIGS. 12A and 12B are diagrams illustrating a method of preprocessing a visible light image according to an embodiment.

Referring to FIGS. 12A and 12B, a visible light image 1210 may represent the subject's facial region. Specifically, the entire facial region including the subject's right eye 1211, the subject's left eye 1212, and the subject's nasal bridge 1213 may be represented.

As shown in FIGS. 12A and 12B, the visible light image 1210 may be preprocessed to generate a preprocessed visible light image 1220. Specifically, the visible light image 1210 may be cropped to generate the preprocessed visible light image 1220.

The preprocessed visible light image 1220 may represent the partial facial region including the subject's right eye 1221 and the subject's nasal bridge 1223.

That is, according to an embodiment, the visible light image 1220 representing the subject's right eye 1221 and the subject's nasal bridge 1223 may be generated by preprocessing the visible light image 1210 representing the entire facial region.

FIGS. 12A and 12B show that preprocessing is performed such that the preprocessed visible light image 1220 represents the subject's right eye 1221 and the subject's nasal bridge 1223, but no limitation thereto is imposed. The visible light image may be subjected to preprocessing such that the preprocessed visible light image represents the subject's left eye and the subject's nasal bridge.

Figures 13A, 13B:
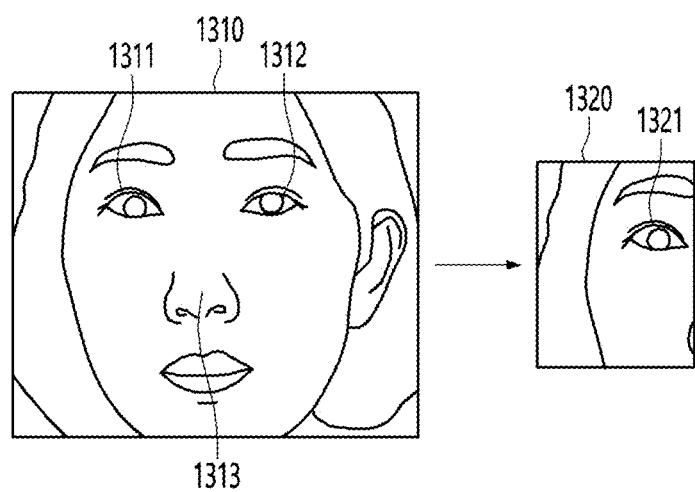
FIGS. 13A and 13B are diagrams illustrating a method of preprocessing a visible light image according to an embodiment.

FIGS. 13A and 13B are diagrams illustrating a method of preprocessing a visible light image according to an embodiment.

Referring to FIGS. 13A and 13B, a visible light image 1310 may represent the subject's facial region. Specifically, the entire facial region including the subject's right eye 1311, the subject's left eye 1312, and the subject's nasal bridge 1313 may be represented.

As shown in FIGS. 13A and 13B, a preprocessed visible light image 1320 may be generated by preprocessing the visible light image 1310. Specifically, the preprocessed visible light image 1320 may be generated by cropping the visible light image 1310.

The preprocessed visible light image 1320 may represent the partial facial region including the subject's right eye 1321.

That is, according to an embodiment, the visible light image 1320 representing the subject's right eye 1321 may be generated by preprocessing the visible light image 1310 representing the entire facial region.

FIGS. 13A and 13B show that preprocessing is performed such that the preprocessed visible light image 1320 represents the subject's right eye 1321, but no limitation thereto is imposed. The visible light image may be subjected to preprocessing such that the preprocessed visible light image represents the subject's left eye.

Figures 14A, 14B:
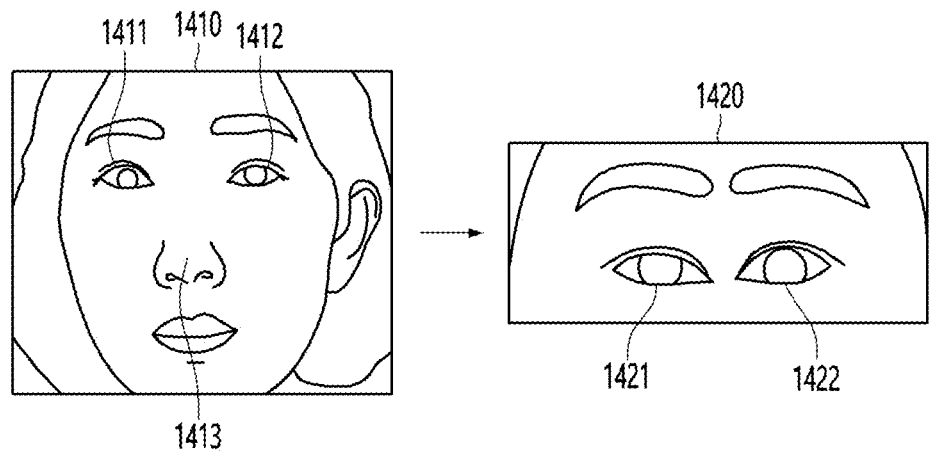
FIGS. 14A and 14B are diagrams illustrating a method of preprocessing a visible light image according to an embodiment.

FIGS. 14A and 14B are diagrams illustrating a method of preprocessing a visible light image according to an embodiment.

Referring to FIGS. 14A and 14B, a visible light image 1410 may represent the subject's facial region. Specifically, the entire facial region including the subject's right eye 1411, the subject's left eye 1412, and the subject's nasal bridge 1413 may be represented.

As shown in FIGS. 14A and 14B, a preprocessed visible light image 1420 may be generated by preprocessing the visible light image 1410. Specifically, the preprocessed visible light image 1420 may be generated by cropping the visible light image.

The preprocessed visible light image 1420 may represent the partial facial region including the subject's right eye 1421 and the subject's left eye 1422.

That is, according to an embodiment, the visible light image 1420 representing the subject's right eye 1421 and the subject's left eye 1422 may be generated by preprocessing the visible light image 1410 representing the entire facial region.

(3) Generating Depth Image Corresponding to Visible Light Image in Step S730

The depth image may be generated on the basis of the visible light image.

For example, the depth image may be generated from the visible light image using the depth image generation module. The depth image generation module may include the pre-trained depth map generation model. Specific details of the depth image generation module, the depth map generation model, and the depth image have been described above in (3) Depth Image Generation Module of 1. Eye Protrusion Value Estimation System, so a redundant description will be omitted.

In generating the depth image, it may be preferable to use the visible light image representing the entire region of the face rather than use the visible light image representing a partial region of the face. This is because a depth image shows a relative depth value of an object represented in an underlying visible light image, and the perspective of the objects represented in the visible light image may be better applied when the visible light image representing the entire facial region is used.

In generating the depth image, it may be preferable to use the visible light image in which the facial region makes up a higher proportion than the background region rather than the visible light image in which the background region makes up a higher proportion than the facial region. This is because a depth image shows a relative depth value of an object represented in an underlying visible light image, and the depth value for the facial region may be better applied when the background region makes up a large proportion.

In order to generate a depth image using a visible light image in which the entire facial region makes up a high proportion, the visible light image in which the entire facial region makes up a high proportion may be obtained in the step of obtaining the visible light image. Alternatively, before the depth image is generated on the basis of the obtained visible light image, the visible light image may be cropped to generate the visible light image in which the entire facial region makes up a high proportion, and the depth image may be generated on the basis of the cropped visible light image.

(4) Generating Preprocessed Depth Image by Preprocessing Depth Image in Step S740

The preprocessed depth image may be generated by preprocessing the generated depth image. For example, the depth image may be preprocessed using the preprocessing module. Specific details of the preprocessing module and the preprocessed depth image have been described above in (4) Preprocessing Module of 1. Eye Protrusion Value Estimation System, so a redundant description will be omitted.

(5) Applying Both Preprocessed Visible Light Image and Preprocessed Depth Image to Eye Protrusion Value Estimation Model to Estimate Eye Protrusion Value for Subject's Eye in Step S750

Both the preprocessed visible light image and the preprocessed depth image may be applied to the eye protrusion value estimation model to estimate an eye protrusion value for the subject's eye. Specific details of the eye protrusion value estimation model and estimation of the eye protrusion value have been described above in (5) Eye Protrusion Value Estimation Module of 1. Eye Protrusion Value Estimation System, so a redundant description will be omitted.

An eye protrusion value may be estimated for each visible light image.

For example, as described above, when one visible light image is obtained, one eye protrusion value for the one visible light image may be estimated.

As another example, as described above, when several visible light images are obtained, several eye protrusion values may be estimated on the basis of the respective visible light images, and an average value of the values may be estimated as a final eye protrusion value. In this way, when an average value is estimated as an eye protrusion value, a consistently accurate eye protrusion value may be estimated compared to an eye protrusion value estimated on the basis of one visible light image.

(6) Providing Information on Basis of Estimated Eye Protrusion Value in Step S760

The information may be provided on the basis of the estimated eye protrusion value.

For example, an eye protrusion value shown in the visible light image may be provided on the basis of the estimated eye protrusion value.

Figure 15A:
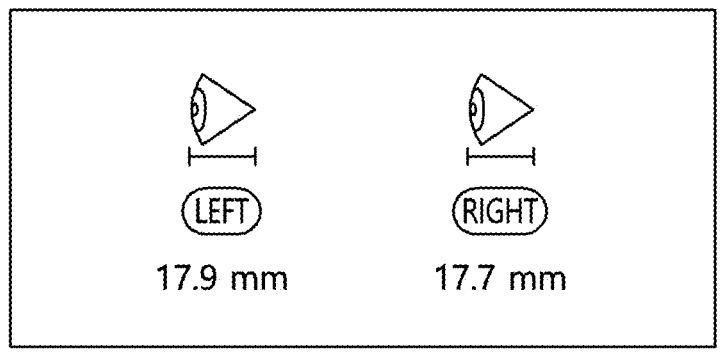
FIGS. 15A and 15B are a diagram illustrating a UI for providing an eye protrusion value according to an embodiment.
Figure 15B:
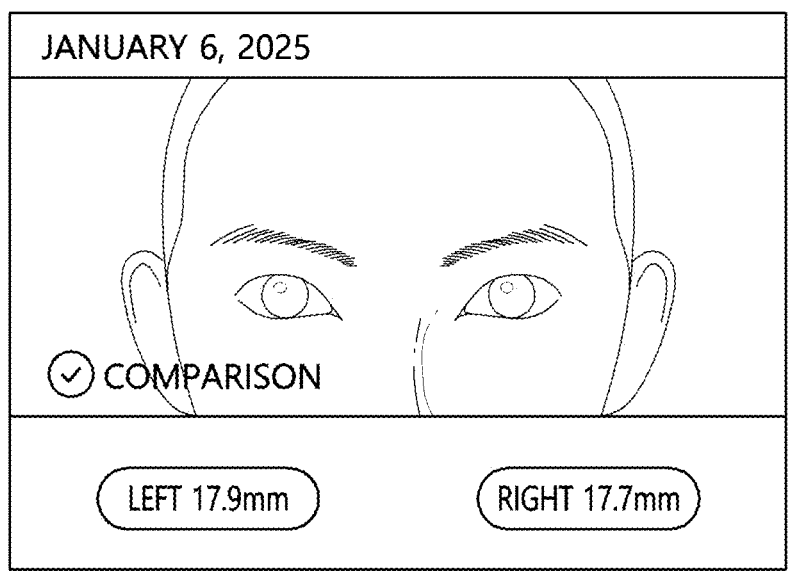

FIGS. 15A and 15B are a diagram illustrating a UI for providing an eye protrusion value according to an embodiment.

An eye protrusion value may be provided numerically for each of the subject's eyes. For example, as shown in FIG. 15A, the estimated eye protrusion value for the subject's left eye may be provided as 17.9 mm, and the estimated eye protrusion value for the subject's right eye may be provided as 17.7 mm.

Herein, as shown in FIG. 15B, an eye protrusion value for each of the subject's eyes may be provided together with the visible light image on which the analysis is based.

Figure 16:
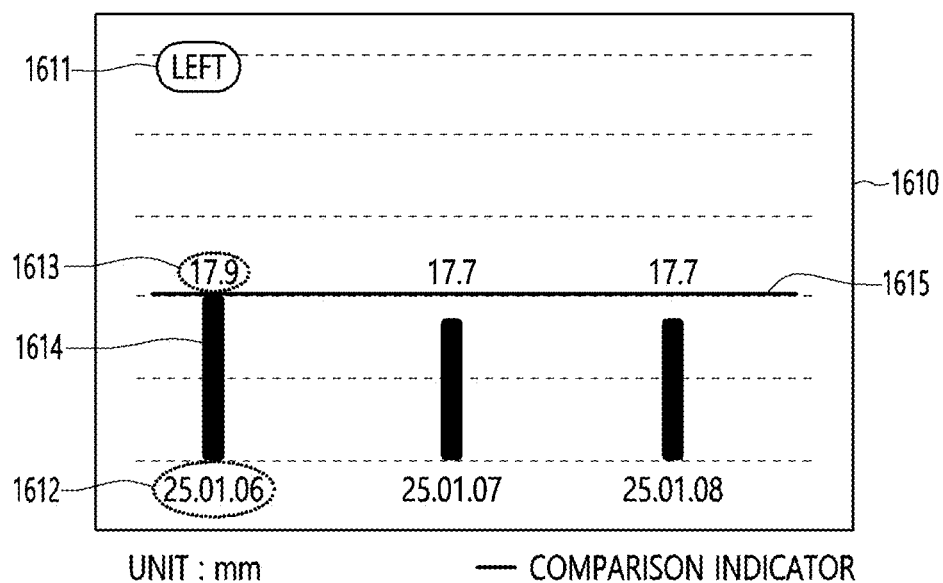
FIG. 16 is a diagram illustrating a UI for providing graphs of eye protrusion values according to an embodiment.
Figure 16:
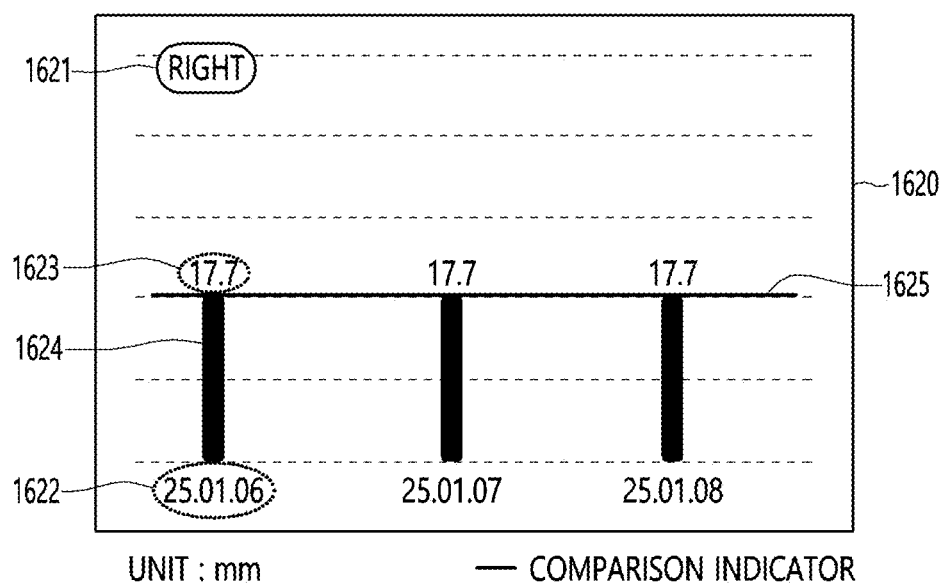

FIG. 16 is a diagram illustrating a UI for providing graphs of eye protrusion values according to an embodiment.

Referring to FIG. 16, the UI for providing graphs of eye protrusion values may display graph interfaces 1610 and 1620, eye position indicators 1611 and 1621, date indicators 1612 and 1622, numeric indicators 1613 and 1623, bar indicators 1614 and 1624, and comparison indicators 1615 and 1625.

The graph interfaces 1610 and 1620 may provide estimated eye protrusion values.

The graph interfaces 1610 and 1620 may provide graphs of estimated eye protrusion values on a daily basis and/or a weekly basis.

For example, the graph interfaces 1610 and 1620 may provide bar graphs of estimated eye protrusion values on a daily basis and/or a weekly basis. As a specific example, as shown in FIG. 16, eye protrusion values may be estimated for each day, and graphs of the estimated eye protrusion values may be provided for each day. Through this, eye protrusion values can be known at shorter intervals and with greater frequency than when the patient visits the hospital in person, so changes in the eye protrusion values can be recognized more consistently at a higher frequency.

The eye position indicators 1611 and 1621 may display the positions of the subject's eyes, as provided by the graph interfaces 1610 and 1620. For example, as shown in FIG. 16, when the eye position indicator 1611 shows the left, the graph interface 1610 may provide the estimated eye protrusion values for the subject's left eye. As another example, when the eye position indicator 1621 shows the right, the graph interface 1620 may provide the estimated eye protrusion values for the subject's right eye.

The date indicators 1612 and 1622 may show the dates on which the eye protrusion values were estimated.

The numeric indicators 1613 and 1623 may show the estimated eye protrusion values as specific numbers. The numeric indicators 1613 and 1623 may be realized to show the eye protrusion values corresponding to the date among the dates the date indicators 1612 and 1622 show.

The bar indicators 1614 and 1624 may show the estimated eye protrusion values as bars. The bar indicators 1614 and 1624 may be realized to show the eye protrusion values corresponding to the date among the dates the date indicators 1612 and 1622 show.

Referring to FIG. 16, the estimated eye protrusion values may be provided as specific numerical values and/or bars corresponding to the numerical values together with the dates on which the eye protrusion values were estimated. For example, regarding the estimated eye protrusion values, together with the date indicators 1612 and 1622, the eye protrusion values corresponding to the date indicators 1612 and 1622 may be realized as the numeric indicators 1613 and 1623 and/or the bar indicators 1614 and 1624. As a specific example, when the eye protrusion value of the left eye were measured to be 17.9 mm on 6 Jan. 2025, the graph interface 1610 may show the eye position indicator 1611 as the left, the date indicator 1612 as 2025, Jan. 6, the numeric indicator 1613 as 17.9, and the bar indicator 1614 as shown in FIG. 16.

As another example, although not shown, the pieces of information shown in the graph interfaces 1610 and 1620 may be provided in the form of line graphs displaying the estimated eye protrusion values on a daily basis and/or a weekly basis. In this case, the eye protrusion values may not be provided as the bar indicators 1614 and 1624 shown in FIG. 16, but may be represented as spots, and the graph interfaces 1610 and 1620 may provide the eye protrusion values in the form of line graphs with lines connecting the spots. The eye protrusion values measured on a daily basis or a weekly basis may be provided with the comparison indicators 1615 and 1625.

As another example, when an estimated eye protrusion value is equal to or greater than a predetermined threshold, hospital visit guidance information for the subject may be provided. In this case, the threshold may be determined considering the subject's race and/or facial shape.

As still another example, when an estimated eye protrusion value has increased from a past eye protrusion value for the subject by a predetermined threshold or more, hospital visit guidance information for the subject may be provided. In this case, the threshold may be determined considering the subject's race and/or facial shape. A past eye protrusion value for the subject may be stored in the mobile device. Alternatively, the past eye protrusion value may be an eye protrusion value estimated on the basis of a visible light image of the subject's past face.

As yet still another example, information obtained by determining activity of thyroid eye disease for the subject may be provided on the basis of an estimated eye protrusion value. As a specific example, an estimated eye protrusion value may be used to determine the clinical activity score (CAS) related to activity of thyroid eye disease. For example, when an estimated eye protrusion value increases by 2 mm or more, the CAS of 1 may be assigned.

As yet still another example, information obtained by determining severity of thyroid eye disease for the subject may be provided on the basis of an estimated eye protrusion value. As a specific example, an estimated eye protrusion value may be used to determine severity of thyroid eye disease. For example, when an estimated eye protrusion value increases by 2 mm or more, it may be determined that severity of thyroid eye disease is high.

As yet still another example, auxiliary information for diagnosis and/or medical examination by a medical worker may be provided on the basis of an estimated eye protrusion value.

As yet still another example, information obtained by determining whether the subject needs medication treatment may be provided on the basis of an estimated eye protrusion value.

As yet still another example, information obtained by determining whether the subject needs surgery may be provided on the basis of an estimated eye protrusion value.

As yet still another example, information obtained by determining the extent of surgery for the subject may be provided on the basis of an estimated eye protrusion value. (An eye protrusion value at a past time point may be estimated using a past image.)

As yet still another example, eye protrusion value monitoring information for the subject may be provided on the basis of an estimated eye protrusion value. For example, an eye protrusion value may be estimated on a daily basis or a weekly basis, and eye protrusion value monitoring information may be provided in the form of a graph of the estimated eye protrusion value on a daily basis or a weekly basis. In addition, the above-described monitoring information may be used as an auxiliary means for determining the effectiveness of treatments for exophthalmos in clinical trials.

(7) Variations

In the process of estimating an eye protrusion value according to an embodiment described with reference to FIG. 7, some steps may be omitted.

For example, the visible light image capturing step may be omitted. In this case, a visible light image may be received from the outside. Alternatively, a visible light image stored in the mobile device may be used.

For example, the preprocessing step may be omitted. In this case, the obtained visible light image itself may be used.

For example, the depth image generation step may be omitted. In this case, a depth image may be received from the outside. Alternatively, a depth image stored in the mobile device may be used.

For example, the information providing step may be omitted. In this case, an estimated eye protrusion value may only be stored in the mobile device.

Figure 17:
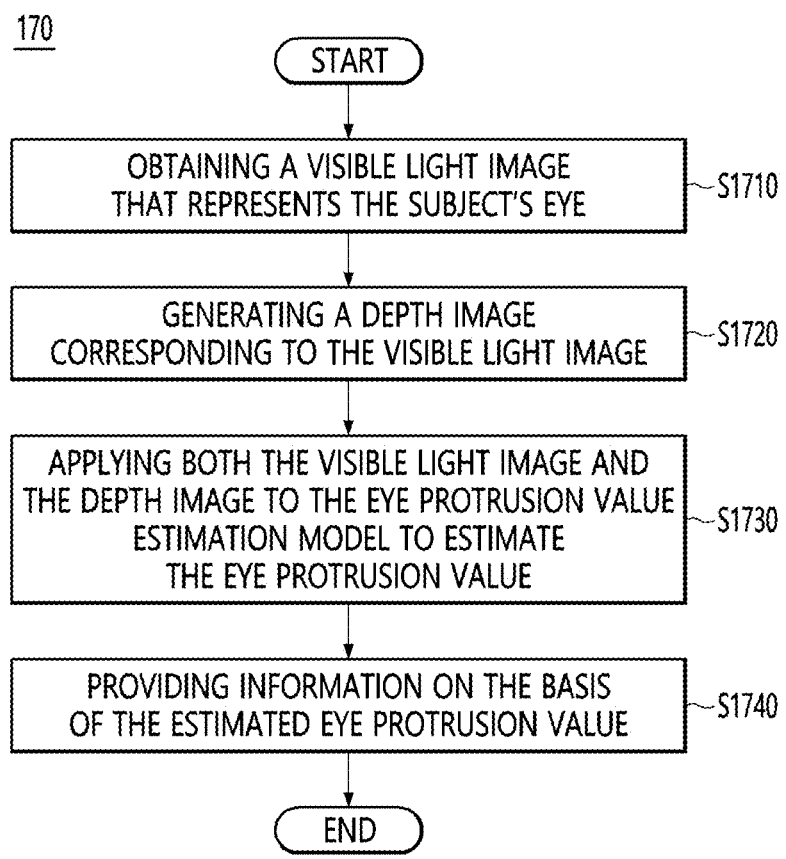
FIG. 17 is a flowchart illustrating a process of estimating an eye protrusion value according to an embodiment.

FIG. 17 is a flowchart illustrating a process of estimating an eye protrusion value according to an embodiment.

Referring to FIG. 17, a method for estimating an eye protrusion value for a subject may include obtaining a visible light image that represents the subject's eye in step S1710, generating a depth image corresponding to the visible light image in step S1720, applying both the visible light image and the depth image to the eye protrusion value estimation model to estimate the eye protrusion value in step S1730, and providing information on the basis of the estimated eye protrusion value in step S1740. That is, the preprocessing step may not be used to estimate the eye protrusion value.

Figure 18:
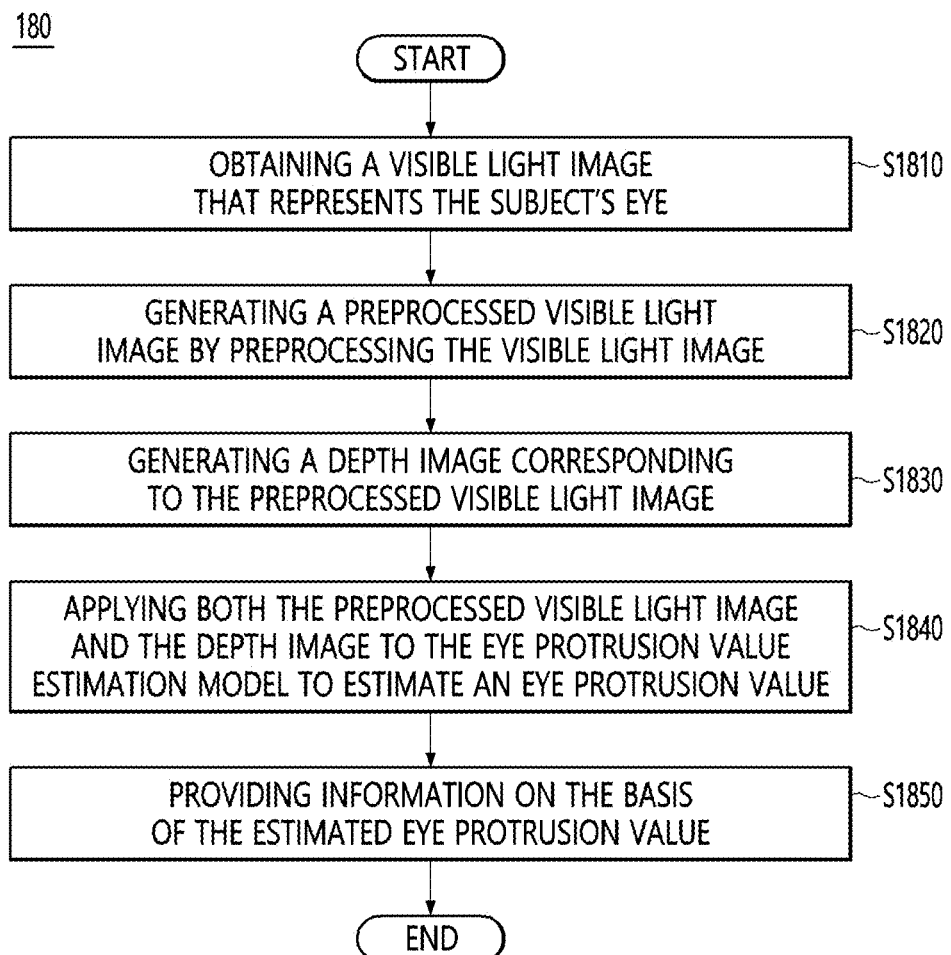
FIG. 18 is a flowchart illustrating a process of estimating an eye protrusion value according to an embodiment.

Herein, in step S1710, one or more visible light images may be obtained. When two or more visible light images are obtained, steps S1720 and S1730 may take place for each of the visible light images to estimate eye protrusion values. The average value of the obtained eye protrusion values may be estimated as a final eye protrusion value. FIG. 18 is a flowchart illustrating a process of estimating an eye protrusion value according to an embodiment.

Referring to FIG. 18, a method for estimating an eye protrusion value for a subject may include obtaining a visible light image that represents the subject's eye in step S1810, generating a preprocessed visible light image by preprocessing the visible light image in step S1820, generating a depth image corresponding to the preprocessed visible light image in step S1830, applying both the preprocessed visible light image and the depth image to the eye protrusion value estimation model to estimate an eye protrusion value in step S1840, and providing information on the basis of the estimated eye protrusion value in step S1850. That is, the preprocessing step for the depth image may not be used to estimate the eye protrusion value.

Herein, in step S1810, one or more visible light images may be obtained. When two or more visible light images are obtained, steps S1820, S1830, and S1840 may take place for each of the visible light images to estimate eye protrusion values. The average value of the obtained eye protrusion values may be estimated as a final eye protrusion value.

3. Comparative Examples about Method for Estimating Eye Protrusion Value

(1) First Comparative Example

For each of the 1,136 visible light images representing the subject's facial region, a 3D facial landmark detection model was applied to calculate the z-axis value between the center of the pupil and the tail of the eye.

In this case, MAE(mm) and Pearson Correlation were as follows.

TABLE 1

|  | MAE(mm) | Pearson Correlation |
|---|---|---|
| Left Eye | 5.35 | −0.01 |
| Right Eye | 5.42 | −0.02 |

(2) Second Comparative Example

For 1,136 depth images respectively corresponding to 1,136 visible light images representing the subject's facial region, the correlations with the eye protrusion values were calculated on the basis of the differences between the pixel values of the position of the pupil center and the pixel values of the position of the eye tail.

In this case, Pearson Correlation was as follows.

TABLE 2

|  | Pearson Correlation |
|---|---|
| Left Eye | 0.050475 |
| Right Eye | 0.035497 |

(3) Third Comparative Example

Using 1,136 visible light images (see FIGS. 11A and 11B) representing both of the subject's eyes and the nasal bridge and an eye protrusion value for one eye corresponding to each of the 1,136 visible light images as a data set, the eye protrusion value estimation model was trained using the artificial neural network.

In this case, the visible light images were used as input data, and the eye protrusion values were used as label values.

In this case, 5-fold cross validation method was used.

In this case, Pearson Correlation, $R^2$, MAE(mm), and MAPE (%) were as follows.

TABLE 3

|  | Pearson Correlation | $R^2$ | MAE(mm) | MAPE(%) |
|---|---|---|---|---|
| Left Eye | 0.78 | 0.61 | 1.41 | 7.77 |
| Right Eye | 0.77 | 0.59 | 1.40 | 7.84 |

4. Experimental Examples about Eye Protrusion Value Estimation Model

(1) First Experimental Example

Using 1,136 visible light images (see FIGS. 11A and 11B) representing both of the subject's eyes and the nasal bridge, 1,136 depth images respectively corresponding to the 1,136 visible light images, and an eye protrusion value for one eye corresponding to each of the 1,136 visible light images as a data set, the eye protrusion value estimation model was trained using the artificial neural network.

In this case, the visible light images and the depth images were used as input data, and the eye protrusion values were used as label values.

In this case, the MIDAS model was used as the depth map generation model.

In this case, 5-fold cross validation method was used.

In this case, Pearson Correlation, $R^2$, MAE(mm), and MAPE (%) were as follows.

TABLE 4

|  | Pearson Correlation | $R^2$ | MAE(mm) | MAPE(%) |
|---|---|---|---|---|
| Left Eye | 0.80 | 0.63 | 1.34 | 7.43 |
| Right Eye | 0.80 | 0.65 | 1.31 | 7.37 |

Through the above results, it can be seen that an eye protrusion value can be accurately estimated using a depth image based on a 2D image, such as a visible light image.

(2) Second Experimental Example

Using 1,136 visible light images (see FIGS. 11A and 11B) representing both of the subject's eyes and the nasal bridge, 1,136 depth images respectively corresponding to the 1,136 visible light images, and an eye protrusion value for one eye corresponding to each of the 1,136 visible light images as a data set, the eye protrusion value estimation model was trained using the artificial neural network.

In this case, the visible light images and the depth images were used as input data, and the eye protrusion values were used as label values.

In this case, the ZoeDepth model was used as the depth map generation model.

In this case, 5-fold cross validation method was used.

In this case, Pearson Correlation, $R^2$, MAE(mm), and MAPE (%) were as follows.

TABLE 5

|  | Pearson Correlation | $R^2$ | MAE(mm) | MAPE(%) |
|---|---|---|---|---|
| Left Eye | 0.82 | 0.67 | 1.28 | 7.11 |
| Right Eye | 0.81 | 0.66 | 1.29 | 7.24 |

In the first experimental example, the MIDAS model was used as the depth map generation model. In the second experimental example, the ZoeDepth model was used as the depth map generation model. In the first experimental example and the second experimental example, different types of depth map generation models for generating depth images were used to estimate eye protrusion values. By comparing the results of the first experimental example and the second experimental example, it can be seen that there is no significant difference in the performance of estimating eye protrusion values and both experimental examples can estimate eye protrusion values with sufficient accuracy.

Through this, it can be seen that even if types of depth map generation models for generating depth images vary, an eye protrusion value can be accurately estimated using a depth image based on a 2D image, such as a visible light image.

(3) Third Experimental Example

Using 1,136 visible light images (see FIGS. 12A and 12B) representing one of the subject's eyes and the nasal bridge, 1,136 depth images respectively corresponding to the 1,136 visible light images, and an eye protrusion value for one eye corresponding to each of the 1,136 visible light images as a data set, the eye protrusion value estimation model was trained using the artificial neural network.

In this case, the visible light images and the depth images were used as input data, and the eye protrusion values were used as label values.

In this case, 5-fold cross validation method was used.

In this case, Pearson Correlation, and MAE(mm) were as follows.

TABLE 6

|  | Pearson Correlation | MAE(mm) |
|---|---|---|
| Left Eye | 0.80 | 1.34 |
| Right Eye | 0.80 | 1.33 |

By comparing the result of the third experimental example with the results of the first experimental example and the second experimental example, it can be seen that higher performance in terms of accuracy is achieved in estimating an eye protrusion value by using an image including both of the subject's eyes rather than one of the subject's eyes.

(4) Fourth Experimental Example

Using 1,136 visible light images (see FIGS. 13A and 13B) representing one of the subject's eyes, 1,136 depth images respectively corresponding to the 1,136 visible light images, and an eye protrusion value for one eye corresponding to each of the 1,136 visible light images as a data set, the eye protrusion value estimation model was trained using the artificial neural network.

In this case, the visible light images and the depth images were used as input data, and the eye protrusion values were used as label values.

In this case, 5-fold cross validation method was used.

In this case, Pearson Correlation, and MAE(mm) were as follows.

TABLE 7

|  | Pearson Correlation | MAE(mm) |
|---|---|---|
| Left Eye | 0.79 | 1.37 |
| Right Eye | 0.79 | 1.38 |

By comparing the result of the fourth experimental example and the result of the third experimental example, it can be seen that higher performance in terms of accuracy is achieved in estimating an eye protrusion value by using an image including the subject's nasal bridge. In addition, by comparing the result of the fourth experimental example and the results of the first experimental example and the second experimental example, it can be seen that higher performance in terms of accuracy is achieved in estimating an eye protrusion value by using an image including both of the subject's eyes rather than one eye and including the subject's nasal bridge rather than not including the nasal bridge.

(5) Fifth Experimental Example

Using 1,136 visible light images (see FIGS. 14A and 14B) representing both of the subject's eyes, 1,136 depth images respectively corresponding to the 1,136 visible light images, and an eye protrusion value for one eye corresponding to each of the 1,136 visible light images as a data set, the eye protrusion value estimation model was trained using the artificial neural network.

In this case, the visible light images and the depth images were used as input data, and the eye protrusion values were used as label values.

In this case, 5-fold cross validation method was used.

In this case, Pearson Correlation, and MAE(mm) were as follows.

TABLE 8

|  | Pearson Correlation | MAE(mm) |
|---|---|---|
| Left Eye | 0.78 | 1.42 |
| Right Eye | 0.80 | 1.34 |

By comparing the result of the fifth experimental example with the results of the first experimental example and the second experimental example, it can be seen that higher performance in terms of accuracy is achieved in estimating an eye protrusion value by using an image including the subject's nasal bridge rather than an image not including the subject's nasal bridge.

(6) Sixth Experimental Example

Using 1,136 visible light images (see FIGS. 11A and 11B) representing both of the subject's eyes and the nasal bridge, 1,136 depth images respectively corresponding to the 1,136 visible light images, and an eye protrusion value for one eye corresponding to each of the 1,136 visible light images as a data set, the eye protrusion value estimation model was trained using the artificial neural network.

In this case, the visible light images and the depth images were used as input data, and the eye protrusion values for one eye were used as single-label values.

In this case, a method in which a training data set and a test data set are divided randomly with a ratio of 7:3 and one experiment is conducted was used.

In this case, Pearson Correlation, $R^2$, and MAE(mm) were as follows.

TABLE 9

|  | Pearson Correlation | R² | MAE(mm) |
|---|---|---|---|
| Left Eye | 0.79 | 0.62 | 1.40 |
| Right Eye | 0.79 | 0.62 | 1.40 |

(7) Seventh Experimental Example

Using 1,136 visible light images (see FIGS. 11A and 11B) representing both of the subject's eyes and the nasal bridge, 1,136 depth images respectively corresponding to the 1,136 visible light images, and an eye protrusion value for each of both eyes corresponding to each of the 1,136 visible light images as a data set, the eye protrusion value estimation model was trained using the artificial neural network.

In this case, the visible light images and the depth images were used as input data, and the eye protrusion values for each of both eyes were used as multi-label values.

In this case, a method in which a training data set and a test data set are divided randomly with a ratio of 7:3 and one experiment is conducted was used.

In this case, Pearson Correlation, $R^2$, and MAE(mm) were as follows.

TABLE 10

|  | Pearson Correlation | R² | MAE(mm) |
|---|---|---|---|
| Left Eye | 0.77 | 0.59 | 1.51 |
| Right Eye | 0.77 | 0.59 | 1.45 |

(8) Eighth Experimental Example

Using 1,136 visible light images (see FIGS. 11A and 11B) representing both of the subject's eyes and the nasal bridge, 1,136 depth images respectively corresponding to the 1,136 visible light images, and an eye protrusion value for one eye corresponding to each of the 1,136 visible light images as a data set, the eye protrusion value estimation model was trained using the artificial neural network.

In this case, the visible light images and the depth images were used as input data, and the eye protrusion values were used as label values.

In this case, 5-fold cross validation method was used.

In this case, Pearson Correlation, $R^2$, MAE(mm), and ICC in the case of obtaining one visible light image to estimate an eye protrusion value and the case of obtaining three visible light images to estimate an eye protrusion value were as follows.

TABLE 11

|  | Pearson Correlation | R² | MAE(mm) | ICC |
|---|---|---|---|---|
| One Image | 0.77 | 0.59 | 1.24 | 0.71 |
| Three Images | 0.78 | 0.61 | 1.22 | 0.72 |

Through the result of the eighth experimental example, it can be seen that an eye protrusion value is more accurately estimated by obtaining two or more visible light images rather than obtaining one visible light image.

The invention claimed is:

1. A method for estimating eye protrusion value of a subject, performed by one or more processors, comprising:
    obtaining an image representing at least one eye of the subject, wherein the image comprises a plurality of pixels assigned a value corresponding to at least one of brightness and color;
    obtaining a pre-processed image by performing a previously stored pre-processing for the image;
    obtaining a depth image corresponding to the pre-processed image by applying the pre-processed image to a pre-trained depth image generation model, wherein the depth image comprises a plurality of pixels, wherein each of the plurality of pixels of the depth image is assigned a depth value representing a relative distance of an object corresponding to each of a plurality of pixels of the pre-processed image; and
    estimating an eye protrusion value for the at least one of eye of the subject by applying both the pre-processed image and the depth image to a pre-trained eye protrusion value estimation model;
    wherein the eye protrusion value estimation model comprises an artificial neural network structure,
    wherein the eye protrusion value estimation model is configured to:
    obtain a first intermediate result by processing values assigned to each pixel of the pre-processed image,
    obtain a second intermediate result by processing values assigned to each pixel of the depth image,
    obtain a third intermediate result by connecting the first intermediate result and the second intermediate result, and
    output the eye protrusion value by processing the third intermediate result.

2. The method of claim 1, wherein the pre-trained eye protrusion value estimation model is trained using a training pre-processed image generated by preprocessing a first image in which at least one eye of a first subject is represented, a training depth image corresponding to the training pre-processed image and an eye protrusion value of the first subject.

3. The method of claim 1, wherein the image includes one eye of the subject, and
    wherein the eye protrusion value indicates an eye protrusion value of the one eye represented in the image.

4. The method of claim 1, wherein the image includes both eyes of the subject, and
    wherein the eye protrusion value is a set consisting of a first eye protrusion value of a left eye of the subject and a second eye protrusion value of a right eye of the subject represented in the image.

5. The method of claim 1, wherein the image includes both eyes of the subject,
    wherein the pre-processed image comprises a first image corresponding to a left eye of the subject and a second image corresponding to a right eye of the subject,
    wherein an eye protrusion value estimated using the first image is a first eye protrusion value of the left eye of the subject represented in the image, and
    wherein an eye protrusion value estimated using the second image is a second eye protrusion value of the right eye of the subject represented in the image.

6. The method of claim 1, wherein the image represents an entire facial region of the subject including both eyes, and
wherein the obtaining the pre-processed image comprises:
obtaining the pre-processed image by cropping the image to at least a partial region where the both eyes of the subject are represented.

7. The method of claim 1, wherein the image represents an entire facial region of the subject including at least one eye and a nasal bridge, and
wherein the obtaining the pre-processed image comprises:
obtaining the pre-processed image by cropping the image to at least a partial region where the at least one eye and the nasal bridge of the subject are represented.

8. The method of claim 1, wherein the depth value is a value between a predetermined minimum value and a predetermined maximum value,
wherein a depth value of a pixel of the depth image, which is corresponding to a pixel of the pre-processed image representing an area closest to a camera, is a predetermined maximum value, and
wherein a depth value of a pixel of the depth image, which is corresponding to a pixel of the pre-processed image representing an area farthest to the camera, is a predetermined minimum value.

9. The method of claim 1, wherein the depth value is a value between a predetermined minimum value and a predetermined maximum value,
wherein a depth value of a pixel of the depth image, which is corresponding to a pixel of the pre-processed image representing an area closest to a camera, is a predetermined minimum value, and
wherein a depth value of a pixel of the depth image, which is corresponding to a pixel of the pre-processed image representing an area farthest to the camera, is a predetermined maximum value.

10. The method of claim 1,
wherein the first intermediate result is obtained through a first layer having a first ResNet structure,
wherein the second intermediate result is obtained through a second layer having the first ResNet structure, and
wherein the third intermediate result is obtained through a third layer having a second ResNet structure.

11. The method of claim 1, wherein the image represents an entire facial region of the subject including both eyes, and
wherein the image satisfies at least one of following conditions:
i) a degree of a smile of a face is within a predetermined level,
ii) a horizontal rotation angle of the face is within a predetermined angle range,
iii) a vertical rotation angle of the face is within a predetermined angle range,
iv) the face is located within a predetermined distance.

12. The method of claim 1, wherein the method further comprises:
providing the estimated eye protrusion value to a user device.

13. The method of claim 1, wherein the method further comprises:
providing a visitation guidance message for the subject when the estimated eye protrusion value is equal to or greater than a predetermined threshold.

14. The method of claim 13, wherein the predetermined threshold is determined based on at least one of a race and a facial shape of the subject.

15. The method of claim 1, wherein the method further comprises:
obtaining a past eye protrusion value; and
providing a visitation guidance message for the subject when a difference between the estimated eye protrusion value and the past eye protrusion value is equal to or greater than a predetermined threshold.

16. The method of claim 1, wherein the method further comprises:
providing an information to determine at least one of a severity of thyroid eye disease and an activity of thyroid eye disease for the subject based on the estimated eye protrusion value.

17. The method of claim 1, wherein the obtaining the image comprises:
obtaining at least a first image and a second image for the subject, and
wherein the first image and the second image are obtained under the same capturing conditions.

18. The method of claim 1, wherein the obtaining the pre-processed image, the obtaining the depth image and the estimating the eye protrusion value are performed once for a first image and once for a second image, and
wherein an average value of a first eye protrusion value for the first image and a second eye protrusion value for the second image is estimated as the eye protrusion value for a day on which the first image and the second image are obtained.

19. A method for estimating eye protrusion value of a subject, performed by one or more processors, comprising:
obtaining an image representing at least one eye of the subject, wherein the image comprises a plurality of pixels assigned a value corresponding to at least one of brightness and color;
obtaining a depth image corresponding to the image by applying the image to a pre-trained depth image generation model, wherein the depth image comprises a plurality of pixels, wherein each of the plurality of pixels of the depth image is assigned a depth value representing a relative distance of an object corresponding to each of the plurality of pixels of the image;
obtaining a pre-processed image by performing a first pre-processing for the image;
obtaining a pre-processed depth image by performing a second pre-processing for the depth image; and
estimating an eye protrusion value for the at least one of eye of the subject by applying both the pre-processed image and the pre-processed depth image to a pre-trained eye protrusion value estimation model;
wherein the eye protrusion value estimation model comprises an artificial neural network structure,
wherein the eye protrusion value estimation model is configured to:
obtain a first intermediate result by processing values assigned to each pixel of the pre-processed image,
obtain a second intermediate result by processing values assigned to each pixel of the pre-processed depth image,
obtain a third intermediate result by connecting the first intermediate result and the second intermediate result, and
output the eye protrusion value by processing the third intermediate result.

* * * * *